(12) United States Patent
Jin et al.

(10) Patent No.: US 12,558,868 B2
(45) Date of Patent: Feb. 24, 2026

(54) FIRE PROTECTION ARTICLE AND RELATED METHODS

(71) Applicant: 3M INNOVATIVE PROPERTIES COMPANY, St. Paul, MN (US)

(72) Inventors: Zhou Jin, Shanghai (CN); Pingfan Wu, Woodbury, MN (US); Tatjana Stecenko, Toronto (CA); Shailendra Bhogilal Rathod, St. Paul, MN (US); Anne Nathalie De Rovere, Woodbury, MN (US); Bhaskara Rao Boddakayala, Troy, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 839 days.

(21) Appl. No.: 17/261,636

(22) PCT Filed: Sep. 7, 2018

(86) PCT No.: PCT/CN2018/104625
§ 371 (c)(1),
(2) Date: Jan. 20, 2021

(87) PCT Pub. No.: WO2020/047846
PCT Pub. Date: Mar. 12, 2020

(65) Prior Publication Data
US 2021/0260850 A1 Aug. 26, 2021

(51) Int. Cl.
*B32B 5/26* (2006.01)
*B32B 5/02* (2006.01)
(Continued)

(52) U.S. Cl.
CPC ............. *B32B 5/273* (2021.05); *B32B 5/022* (2013.01); *B32B 5/028* (2013.01); *B32B 7/12* (2013.01);
(Continued)

(58) Field of Classification Search
CPC ................ B23B 7/12; B23B 2262/105; B23B 2307/304; B23B 2307/3065; H01M 50/231; H01M 50/24
See application file for complete search history.

(56) References Cited

U.S. PATENT DOCUMENTS 4,880,168 A 11/1989 Randall, Jr.
5,104,700 A * 4/1992 Peterson ................. F16L 57/04
428/218

(Continued)

FOREIGN PATENT DOCUMENTS

CN 106848133 6/2017
EP 0714248 6/1996
(Continued)

OTHER PUBLICATIONS

Nextel™312 Woven Fabrics Data Sheet (Year: 2018).*
(Continued)

*Primary Examiner* — Jennifer Wecker
*Assistant Examiner* — Brady C Pilsbury
(74) *Attorney, Agent, or Firm* — Carlos M. Téllez Rodríguez; 3M Innovative Properties Company

(57) ABSTRACT

A fire protection article is provided that includes a fire barrier comprising a plurality of non-combustible fibers, and a passive thermal insulator coupled to the fire barrier and comprising a plurality of non-meltable fibers. Optionally, the fire protection article displays a time to break in the 1100° C. Break Strength Test of at least 10 seconds or a minimum tensile strength at 150° C. of at least 5 kPa. Optionally, the fire barrier comprises substantially continuous fibers that are mutually entangled. The fire barrier and passive thermal insulator can be mutually secured using a suitable polymeric binder, such a thermoplastic fluoropolymer binder. The combination of a relatively thin fire barrier with a comparatively thicker passive thermal insulator can provide thermal (Continued)

runaway protection in lithium-ion battery applications, structural integrity and a high degree of thermal insulation in the event of fire exposure.

6 Claims, 3 Drawing Sheets

(51) Int. Cl.

| | |
|---|---|
| *B32B 7/12* | (2006.01) |
| *H01M 10/613* | (2014.01) |
| *H01M 10/625* | (2014.01) |
| *H01M 10/6554* | (2014.01) |
| *H01M 50/222* | (2021.01) |
| *H01M 50/227* | (2021.01) |
| *H01M 50/229* | (2021.01) |
| *H01M 50/231* | (2021.01) |
| *H01M 50/24* | (2021.01) |

(52) U.S. Cl.

CPC ....... *H01M 50/222* (2021.01); *H01M 50/227* (2021.01); *H01M 50/229* (2021.01); *H01M 50/231* (2021.01); *H01M 50/24* (2021.01); *B32B 2250/20* (2013.01); *B32B 2255/02* (2013.01); *B32B 2255/26* (2013.01); *B32B 2262/0246* (2013.01); *B32B 2262/0284* (2013.01); *B32B 2262/105* (2013.01); *B32B 2307/304* (2013.01); *B32B 2307/3065* (2013.01); *B32B 2307/54* (2013.01); *B32B 2457/10* (2013.01); *B32B 2605/00* (2013.01); *H01M 10/613* (2015.04); *H01M 10/625* (2015.04); *H01M 10/6554* (2015.04); *H01M 2200/00* (2013.01); *H01M 2220/20* (2013.01)

(56) References Cited

U.S. PATENT DOCUMENTS

| | | | | |
|---|---|---|---|---|
| 5,316,834 | A | * | 5/1994 | Matsuda ................. B32B 5/024 |
| | | | | 442/247 |
| 5,502,937 | A | * | 4/1996 | Wilson ................... B32B 15/20 |
| | | | | 52/273 |
| 6,051,103 | A | | 4/2000 | Aikawa |
| 6,617,002 | B2 | | 9/2003 | Wood |
| 6,808,664 | B2 | | 10/2004 | Falk |
| 6,977,109 | B1 | | 12/2005 | Wood |
| 7,284,283 | B2 | | 10/2007 | Mack |
| 7,476,632 | B2 | | 1/2009 | Olson |
| 7,491,354 | B2 | | 2/2009 | Andersen |
| 7,731,878 | B2 | | 6/2010 | Wood |
| 8,443,922 | B2 | | 5/2013 | Borumand |
| 9,676,168 | B2 | | 6/2017 | Contzen |
| 10,512,291 | B2 | * | 12/2019 | Reuben ................. A41D 31/065 |
| 10,710,329 | B2 | | 7/2020 | Reusswig |

| | | | | |
|---|---|---|---|---|
| 2001/0006866 | A1 | * | 7/2001 | Kuroiwa ................. B32B 5/022 |
| | | | | 442/388 |
| 2002/0134484 | A1 | * | 9/2002 | Erb, Jr. ..................... D04H 1/46 |
| | | | | 156/62.6 |
| 2005/0014061 | A1 | * | 1/2005 | Ahn ....................... H01M 50/00 |
| | | | | 429/120 |
| 2006/0040580 | A1 | * | 2/2006 | Ogle .................. D04H 1/43828 |
| | | | | 442/389 |
| 2006/0068278 | A1 | | 3/2006 | Bloom |
| 2006/0141918 | A1 | | 6/2006 | Rienke |
| 2008/0063875 | A1 | | 3/2008 | Robinson |
| 2008/0189840 | A1 | * | 8/2008 | Knoff ......................... B32B 5/26 |
| | | | | 2/458 |
| 2009/0209155 | A1 | * | 8/2009 | Goulet ................... B32B 15/14 |
| | | | | 156/92 |
| 2010/0266788 | A1 | * | 10/2010 | Niccolls ............... F16L 58/181 |
| | | | | 428/447 |
| 2011/0079456 | A1 | | 4/2011 | Borumand |
| 2011/0111163 | A1 | | 5/2011 | Bozouklian |
| 2011/0136937 | A1 | * | 6/2011 | Wierzbicki ............ C09K 21/02 |
| | | | | 523/179 |
| 2013/0101805 | A1 | * | 4/2013 | Altshuler .................. B32B 3/30 |
| | | | | 264/109 |
| 2014/0248814 | A1 | * | 9/2014 | Handermann ............ E04C 2/16 |
| | | | | 442/326 |
| 2014/0259331 | A1 | * | 9/2014 | Maples ................ A41D 31/085 |
| | | | | 2/455 |
| 2016/0211495 | A1 | * | 7/2016 | Haynes ................... B32B 9/007 |
| 2016/0332420 | A1 | | 11/2016 | Reusswig |
| 2018/0194104 | A1 | * | 7/2018 | Kawka ................. B32B 27/304 |
| 2018/0294487 | A1 | * | 10/2018 | Horinouchi ......... H01M 8/0234 |

FOREIGN PATENT DOCUMENTS

| | | | | |
|---|---|---|---|---|
| EP | | 2018450 | 12/2012 | |
| EP | | 3199502 | 3/2017 | |
| EP | | 3323923 | 5/2018 | |
| JP | | 6369181 | 5/1988 | |
| JP | | H09299498 A | 11/1997 | |
| JP | | 2015151100 A | 8/2015 | |
| WO | WO 2014/013216 | | 1/2014 | |
| WO | WO-2017084721 A1 | * | 5/2017 | ............. B32B 3/266 |
| WO | WO 2018-093624 | | 5/2018 | |
| WO | WO 2019-090659 | | 5/2019 | |
| WO | WO 2019-217776 | | 11/2019 | |

OTHER PUBLICATIONS

Shim, 2nd Chapter of Book Titled "Smart Textile Coatings and Laminates" published 2010 (Year: 2010).*
K. Singha et al., "Fiber Crimp Distribution in Nonwoven Structure", Frontiers in Science 2013 2(1): 14-21, (Year: 2013).*
FIBER-LINE "Fiberglass: Strength and Thermal Stability", webpage published 2017 (Year: 2017).*
International Search Report for PCT International Application No. PCT/CN2018/104625, mailed on Jun. 6, 2019, 4 pages.

* cited by examiner

FIRE PROTECTION ARTICLE AND RELATED METHODS

CROSS REFERENCE TO RELATED APPLICATIONS

This application is a national stage filing under 35 U.S.C. 371 of PCT/CN2018/104625 filed Sep. 7, 2018, the disclosure of which is incorporated by reference in its entirety herein.

FIELD OF THE INVENTION

Provided are fire protection articles, and methods thereof, that can be used in preventing thermal runaway propagation in lithium-ion batteries. The provided articles can be especially useful, for example, in electric automotive vehicle, aerospace, and stationary energy storage applications.

BACKGROUND

Technological advancement of personal electronics, electric mobility, and stationary energy storage have extended the boundaries of energy density in lithium-ion batteries. In response to demands for ever increasing energy density, battery modules have become prone to fire hazards. Fires are borne from exothermic reactions within a battery cell and are fueled by flammable electrolytes and plastic battery components. Battery fires can be caused by manufacturing flaws, overheating, overcharging, or punctures.

A catastrophic phenomenon called thermal runaway propagation occurs when one cell in a battery module catches on fire, which then spreads to neighboring cells, and then to cells throughout the entire battery in a chain reaction. These fires can be potentially massive, especially in high power devices such as electric vehicles, where it is common to see battery packs containing tens, hundreds, or even thousands, of individual cells. Such fires are not limited to the battery and can spread to surrounding structures and endanger occupants of the vehicle or other structures in which these batteries are located.

When thermal runaway occurs in a cell, it is desirable for the thermal management system to block or absorb the heat and prevent adjacent cells from overheating and themselves entering thermal runaway. In electric vehicle applications, it is also important to protect occupants from the heat generated by the fire, thereby allowing sufficient time to stop the vehicle and escape.

Stringent fire protection requirements also exist in the aerospace field. The Federal Aviation Administration (FAA) regulations require thermal and acoustical insulation blanket assemblies in commercial aircraft to provide flame propagation resistance and burn through protection when installed in lower half of the fuselage. Conventionally, these assemblies include thermal and acoustical insulation blankets encapsulated within a film covering or bag. The film coverings typically fully encapsulate a thermal and/or acoustic insulation materials. FAA regulations significantly constrain the materials and configurations possible for the insulation material and film covering or bag.

SUMMARY

Protecting against the dangers associated with a sudden fire is a significant technical challenge. One problem in devising a universal solution is that materials that work well in protecting against one aspect of a battery fire fall short in other ways. For example, non-woven webs of polymeric fibers can display excellent thermal insulation properties but common polymers tend to be flammable. Heat shield materials made from woven non-combustible fibers can be effective in preventing penetration of a fire but tend to be too thin to adequately insulate against the intense heat of a fire. Using thicker layers of heat shield materials is generally not cost effective. Combinations of these materials could work, but it can be difficult to bond these materials to each other, particularly when the selection of bonding materials may be constrained by flammability issues.

Another technical difficulty arises when using fibers used in conventional thermal management systems. Even fire-resistant fibers are prone to melting at sufficiently high temperatures, and those that cannot melt can introduce new problems associated with fiber shedding during product manufacture and use. Non-meltable fibers do not bind to each other within a fibrous web and thus alternative ways must be devised to secure these fibers so they do not escape and contaminate other battery components and spaces surrounding the battery. This also enables use of shorter fibers which have the greatest tendency to shed.

A solution to these requirements can be provided by a fire protection article that combines a high-strength fire barrier containing non-combustible fibers with a passive thermal insulator comprising a non-meltable fibers such as oxidized polyacrylonitrile fibers. The fire barrier and passive thermal insulator can be secured to each other using a suitable polymeric binder, such a thermoplastic fluoropolymer binder. In electric vehicle battery applications, the combination of a relatively thin fire barrier with a comparatively thicker passive thermal insulator can provide thermal runaway protection, structural integrity and a high degree of thermal insulation in the event of fire exposure.

In a first aspect, a fire protection article is provided. The fire protection article comprises: a fire barrier comprising a plurality of non-combustible fibers; and a passive thermal insulator coupled to the fire barrier, the passive thermal insulator comprising a plurality of non-meltable fibers, wherein the fire protection article displays a time to break in the 1100° C. Break Strength Test of at least 10 seconds.

In a second aspect, a battery compartment for an electric vehicle is provided comprising: a compartment wall having an inner and outer major surface, the inner surface defining at least part of an enclosure; and the fire protection article disposed on either the inner or outer surface.

In a third aspect, a battery compartment for an electric vehicle is provided comprising: at least one compartment wall having an inner and outer major surface, the inner major surface defining at least part of an enclosure; a fire barrier disposed on the inner major surface, the fire barrier comprising a plurality of non-combustible fibers; and a passive thermal insulator disposed on the outer major surface, the passive thermal insulator comprising a plurality of non-meltable fibers, wherein the fire protection article displays a time to break in the 1100° C. Break Strength Test of at least 10 seconds.

In a fourth aspect, a method of making a fire protection article is provided comprising: coating a polymeric binder onto an outer surface of a fire barrier comprising a plurality of non-combustible fibers; placing the coated fire barrier in contact with a passive thermal insulator comprising a plurality of non-meltable fibers; and heating the polymeric binder to laminate the fire barrier and passive thermal insulator to each other to provide the fire protection article with a time to break in the 1100° C. Break Strength Test of at least 10 seconds.

Figure 1:
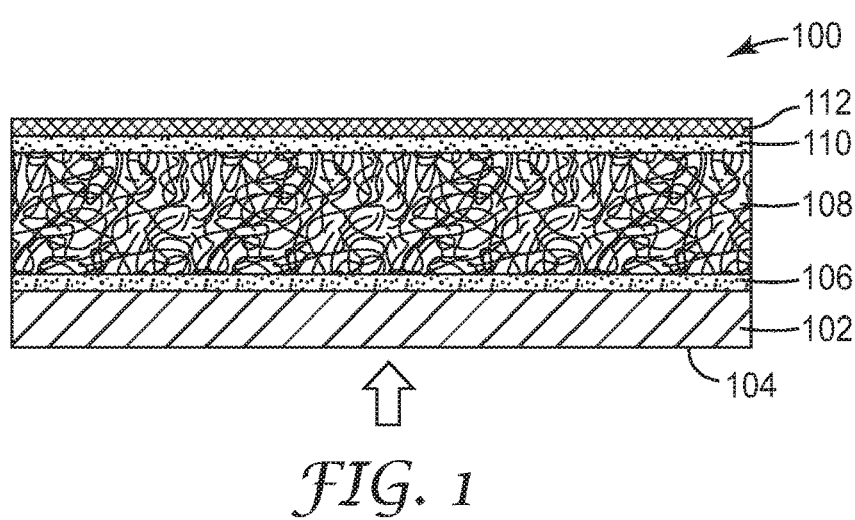
FIGS. 1-4 are side cross-sectional views of a fire protection articles according to various exemplary embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:

"ambient conditions" means at 25° C. and 101.3 kPa pressure;

"average" means number average, unless otherwise specified;

"copolymer" refers to polymers made from repeat units of two or more different polymers and includes random, block and star (e.g. dendritic) copolymers;

"average fiber diameter" of fibers in a passive thermal insulator is determined by producing one or more images of the fiber structure, such as by using a scanning electron microscope; measuring the transverse dimension of clearly visible fibers in the one or more images resulting in a total number of fiber diameters; and calculating the average fiber diameter based on that total number of fiber diameters;

"non-woven fibrous web" means a plurality of fibers characterized by entanglement or chemical bonding of the fibers to form a sheet or mat exhibiting a structure of individual fibers or filaments which are interlaid, but not in an identifiable manner as in a knitted fabric;

"polymer" means a relatively high molecular weight material having a molecular weight of at least 10,000 g/mol;

"size" refers to the longest dimension of a given object or surface;

"substantially" means to a significant degree, as in an amount of at least 30%, 40, 50, 60, 70, 80, 90, 95, 96, 97, 98, 99, 99.5, 99.9, 99.99, or 99.999%, or 100%; and "thickness" means the average distance between opposing sides of a layer or multilayer article when relaxed.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

The fire protection articles described herein, in some embodiments, can be effective in mitigating the effects of thermal runaway propagation in lithium batteries. These articles can also have potential uses in other commercial and industrial applications, such as automotive and aerospace applications, where it is necessary to protect people or surrounding structures from the effects of a fire. For example, the provided fire protection articles can be incorporated into primary structures extending along or around the fuselage of an aircraft to protect aircraft occupants. Such applications can include fire protection around lithium battery modules, fuel tanks, and any other enclosures or compartments located in aircraft fire zones.

The provided fire protection articles generally include a fire barrier comprising a plurality of non-combustible fibers and a passive thermal insulator coupled to the fire barrier, the passive thermal insulator comprising a plurality of non-meltable fibers. Optionally, the fire protection article can include one or more scrims, that may or may not be fire-resistant. These layers may be bonded to compartment walls or each other using a suitable binder. The aforementioned components and configurations thereof are described in the sub-sections that follow.

Fire Protection Articles

A fire protection article according to one embodiment is shown in FIG. 1 and hereinafter designated by the numeral 100. The fire protection article 100 is oriented toward the fire source. For clarity, the block arrow in FIG. 1 shows the expected direction of incoming fire propagation. This convention regarding the orientation of the fire protection article shall also apply to FIGS. 2-4.

The fire protection article 100 includes a fire barrier 102 (the bottom layer in FIG. 1) having a major surface facing toward the fire source. The fire barrier 102 is generally made from a material that has a low thermal conductivity to reduce heat transfer from a malfunctioning cell to neighboring cells in the event of a fire. The fire barrier 102 also prevents penetration of flames into the remaining layers of the fire protection article 100. Suitable fire barrier materials can be made from, for example, tightly-knit ceramic fibers.

In this embodiment, the fire protection article 100 has an exposed surface 104 that coincides with the major surface of the fire barrier 102, but this need not be the case. As will be discussed in later embodiments, one or more additional layers could be included within, or disposed on, the fire barrier 102. Such additional layers can include metal films or metallized layers that enhance thermal conductivity across the fire protection article 100, binder layers, and/or barrier films.

The fire barrier 102 can have any suitable thickness. Depending on the nature of the fibers and/or other components in the fire barrier, the preferred thickness often reflects a balance amongst the factors of cost, web strength, and fire resistance. The fire barrier can have an overall thickness in the range from 100 micrometers to 25000 micrometers, from 500 micrometers to 12500 micrometers, from 2000 micrometers to 5000 micrometers, or in some embodiments, less than, equal to, or greater than 100 micrometers, 200, 300, 400, 500, 600, 700, 800, 900, 1000, 1200, 1500, 1700, 2000, 2500, 3000, 3500, 4000, 4500, 5000, 6000, 7000, 8000, 9000, 10000, 12500, 15000, 17000, 20000, or 25000 micrometers.

Extending across and directly contacting the fire barrier 102 is a first binder layer 106. Extending across and directly contacting the binder layer 106 is a passive thermal insulator 108. These layers, and successive layers, are shown flatly contacting each other but it is to be understood that the layers of the fire protection article 100 are flexible and the contacting areas between layers may not be planar or even continuous.

Here, the first binder layer 106 acts as a bonding agent that adheres the fire barrier 102 and the passive thermal insulator 108 to each other. In some embodiments, the binder layer 106 can also function as a sealing layer that reduces or prevents shedding of any loose fibers present in the fire barrier 102 and/or the passive thermal insulator 108. The binder layer 106 can include organic and/or inorganic materials, as shall be described in more detail later.

In various embodiments, the passive thermal insulator 108 is a lofted non-woven fibrous layer that is compressible and can substantially resume its original shape after removal of a compressive force. The passive thermal insulator 108 can have any suitable thickness based on the space allocated for a given application. As a thermal insulator used in an electric vehicle compartment, the passive thermal insulator 108 can have a thickness of from 1 millimeter to 50 millimeters, from 2 millimeters to 25 millimeters, from 3 millimeters to 20 millimeters, or in some embodiments, less than, equal to, or greater than 1 millimeter, 2, 3, 4, 5, 6, 7, 8, 9, 10, 12, 15, 17, 20, 22, 25, 27, 30, 35, 40, 45, or 50 millimeters.

Referring again to FIG. 1, a second binder layer 110 extends across and directly contacts the passive thermal insulator 108 and a scrim 112 extends across and directly contacts the second binder layer 110. The second binder layer 110, which may or may not have the same composition as the first binder layer 106, serves to bond the scrim 112 and passive thermal insulator 108 to each other. The scrim 112 and second binder layer 110 work together to seal the fibers of the passive thermal insulator 108 within the fire protection article 100.

Notably, the first and second binder layers 106, 110 are optional and the passive thermal insulator 108 may be attached to either or both of the fire barrier 102 and scrim 112 in alternative ways. For example, these layers can be mutually attached by mechanical retention, such as by sewing, fasteners, or even fiber entanglements between layers.

If desired, the passive thermal insulator 108 can be edge-sealed individually or collectively with the scrim 212 and the fire barrier 102 to prevent escape of fibers from the peripheral edges of the fire protection article 100. Details concerning the edge sealing of layers are described elsewhere in co-pending PCT application No. PCT/CN2017/110372 (Wu et al.).

While not explicitly shown in FIG. 1, the fire protection article 100 can also include one or more additional layers disposed on a major surface of the fire protection article 100 or disposed between the layers described above. As one example, it can be advantageous for a metal layer to be disposed on a major surface of the fire barrier 102 opposite the passive thermal insulator 108.

The metal layer can be made from a lightweight metal that is highly thermally conductive, such as aluminum. The presence of a metal layer, such as an aluminum layer, in the fire protection article 100 can substantially de-localize hot spots in the plane of the article by causing heat to quickly spread across the metal layer via thermal conduction. A highly reflective metal layer can also reflect the radiation from the fire away from the back surface of the fire protection article 100 (the surface facing away from the fire). This can significantly reduce the likelihood of thermal runaway propagation in a battery cell adjacent to the fire protection article 100. Besides delocalizing heat, the metal layer also functions as a solid barrier layer that prevents intrusion of fire and smoke, further protecting occupants of an electric vehicle from a battery fire.

The metal layer can have any suitable thickness. The thickness can be selected to provide enough mass to rapidly conduct heat across the layer, with only a small weight contribution to the overall fire protection article. The thickness of the metal layer can be from 0.1 micrometers to 1000 micrometers, from 1 micrometers to 500 micrometers, from 10 micrometers to 100 micrometers, or in some embodiments, less than, equal to, or greater than 0.1 micrometers, 0.5, 1, 2, 5, 7, 10, 15, 20, 25, 30, 35, 40, 45, 50, 60, 70, 80, 90, 100, 110, 120, 150, 170, 200, 250, 300, 350, 400, 450, 500, 600, 700, 800, 900, or 1000 micrometers.

The metal layer may be provided by laminating a discrete metal foil having a uniform thickness to the fire barrier 102 and/or passive thermal insulator 108. Lamination generally uses one or more binder layers (analogous to first and second binder layers 106, 110) as bonding agents. It is also possible to dispose a metal layer without need for a binder layer. For instance, the metal layer can be deposited in situ onto the fire barrier 102 and/or passive thermal insulator 108 by vacuum deposition, ion plating, electroplating, or electroless plating.

Other layers that may also be included in the fire protection article 100 include one or more fiberglass layers, including woven fiberglass layers, and nylon or polyimide fabrics or films. While these layers may not survive at combustion temperatures these layers can help provide the fire protection article with greater tensile or break strength at intermediate temperatures below combustion temperatures, such as at 150° C. Such materials can also be used as exterior bagging or wrapping layers for the provided fire protection articles.

Figure 2:
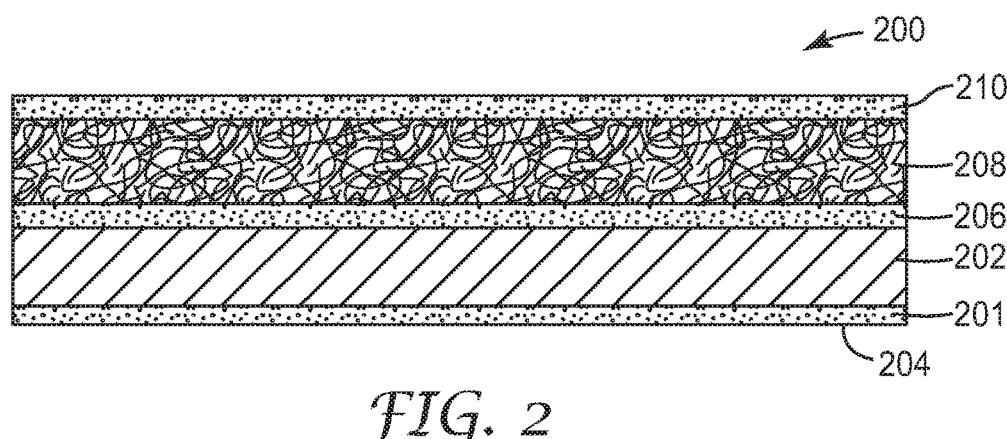

FIG. 2 illustrates an alternative embodiment of a fire protection article 200 comprised of a fire barrier 202 and a passive thermal insulator 208, bounded by three discrete binder layers 201, 206, 210 as shown. The fire protection article 200 differs from the fire protection article 100 in two respects. First, the binder layer 201 is disposed on an exposed surface 204 of the fire protection article 200, providing a barrier to prevent fibers from the fire barrier 202 from becoming dislodged from the exposed surface 204 and posing a nuisance. Second, this embodiment omits the scrim and instead relies primarily on the binder layer 210 to prevent shedding of fibers from the passive thermal insulator 208.

Figure 3:
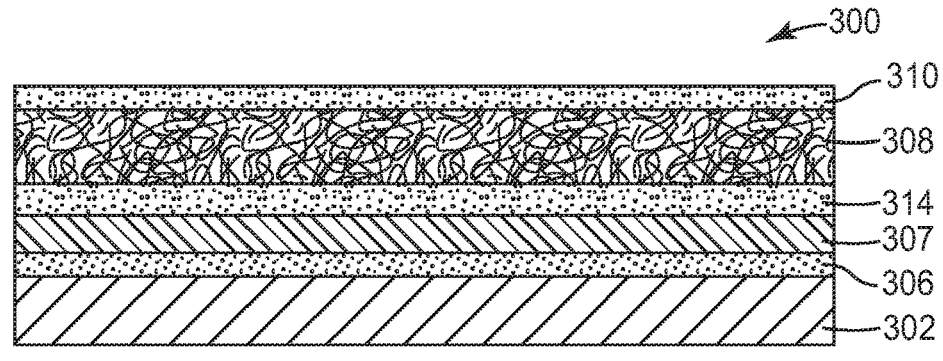

FIG. 3 shows a fire protection article 300 that includes, in the following order, a fire barrier 302, a first binder layer 306, a compartment wall 307, a second binder layer 314, a passive thermal insulator 308, and a third binder layer 310. Incorporation of the compartment wall 307 enables the fire protection article 300 itself to be used as a structural component in a battery compartment. Typically, the compartment wall is made from a rigid material. The rigid material can be a metal such as aluminum or a fire-resistant composite material. Composite materials can be advantageous in applications where lower weight and/or corrosion resistance is required.

Figures 4, 5, 6:
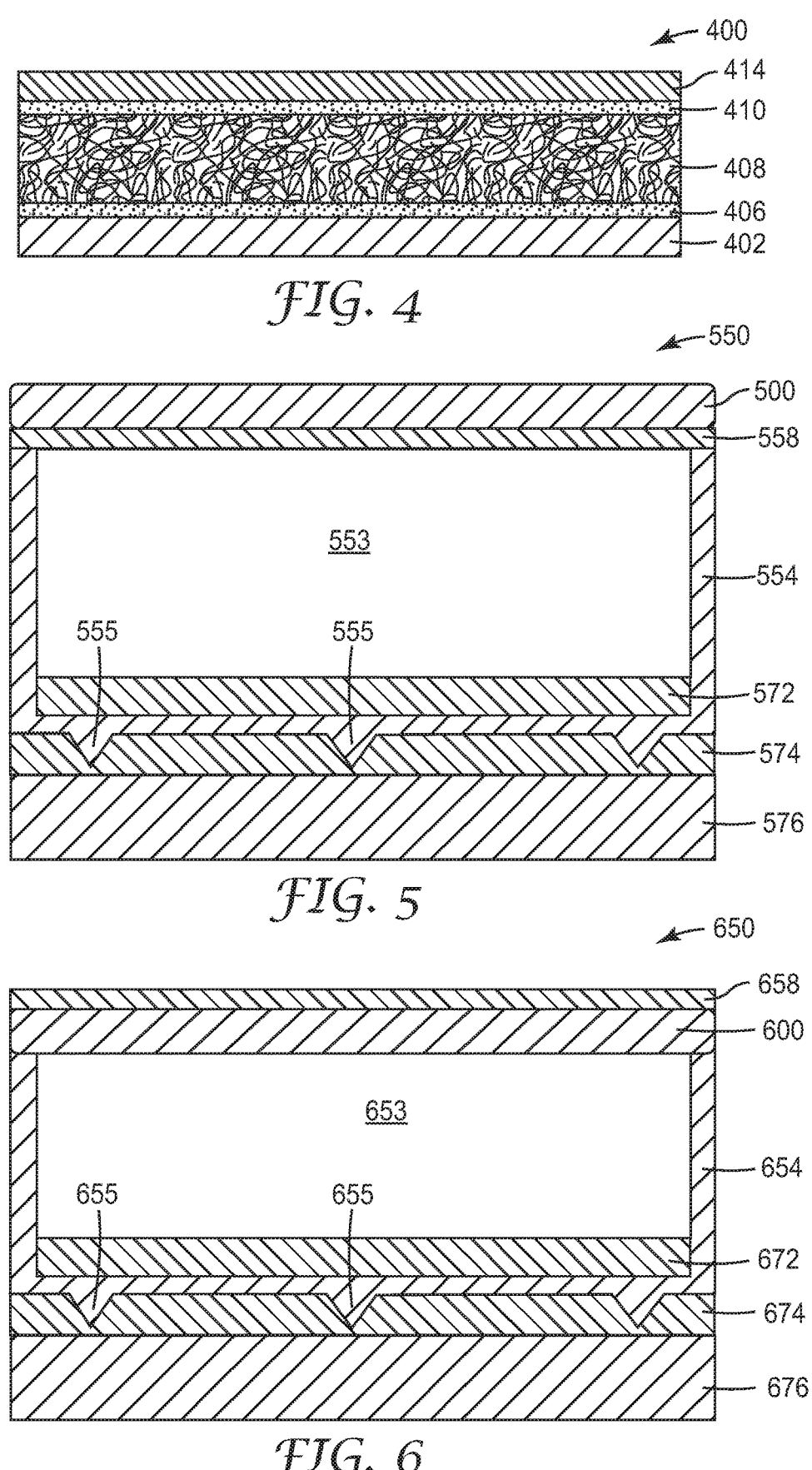
FIGS. 5-6 are side cross-sectional views of battery compartments according to various exemplary embodiments.

FIG. 4 shows yet another fire protection article 400 which also includes a compartment wall, but at a different location relative to the remaining layers. As shown, the fire protection article 400 includes a fire barrier 402, a first binder layer 406, a passive thermal insulator 408, a second binder layer 410, and a compartment wall 414. In this embodiment, the compartment wall 414 is the outermost layer and is protected from the fire by both the fire barrier 402 and the passive thermal insulator 408. Such a configuration could be beneficial where, for example, the compartment wall 414 is itself prone to be damaged by heat from a fire.

In some embodiments, a scrim can extend across a major surface of the passive thermal insulator 408 opposite the compartment wall 414. In the same or alternative embodiments, a scrim can extend across a major surface of the fire barrier 402 opposite the compartment wall 414. Such scrims may be bonded to the fire protection article 400 using a binder layer or mechanical fasteners, as previously described.

In each of FIGS. 1-4, the binder layer(s) optionally penetrates to some degree into its neighboring layers, particularly where the neighboring layer is a porous layer. Penetration of a binder layer into a fire barrier, passive thermal insulator, or scrim can provide an increased bond surface area and improved mechanical retention between these layers and resist separation at the bond interface. Deeper penetration of the binder composition into the passive thermal insulator along its peripheral edges can also be used to facilitate edge sealing of the passive thermal insulator between scrims, as mentioned earlier.

Other aspects of the fire protection articles 200, 300, 400 are essentially analogous to those already described with respect to the fire protection article 100 in FIG. 1 and shall not be repeated here.

FIGS. 5 and 6 show battery compartments 550, 650 that incorporate fire protection articles 500, 600, respectively. For clarity, the fire protection articles 500, 600 are represented as monolithic layers, but each can have the configuration of any one of the fire protection articles 100, 200, 300, 400 or variants thereof as previously described.

In each of these schematic representations, an enclosure 553, 653 is formed by the space collectively provided by a tray 554, 654 and a lid 558, 658 when the tray 554, 654 and lid 558, 658 are mutually engaged. The fire protection article 500, 600 is fastened to the lid 558, 658. In FIG. 5, the fire protection article 500 is located on the top of the lid 558. In FIG. 6, the fire protection article 600 is located on the bottom of the lid 658.

Optionally and as shown, a coolant plate 572, 672 extends along the bottom wall of the tray 554, 654 and defines the bottom surface of the enclosure 553, 653. The coolant plate 572, 672 provides a heat sink to diffuse heat out of the enclosure 553, 653. In some embodiments, the coolant plate 572, 672 includes a chiller that circulates water or other liquid coolant through the coolant plate 572, 672 to extract excess heat from the enclosure 553, 653. Alternatively, the coolant plate 572, 672 could circulate air or some other cooling medium for heat removal. In this embodiment, the tray 554, 654 includes a series of channels 555, 655 to accommodate the flow of coolant liquid along the coolant plate 572, 672.

Referring again to FIGS. 5-6, the tray 554, 654 is attached to a bottom plate 576, 676. Optionally and as shown, the tray 554, 654 and bottom plate 576, 676 are separated from each other by a passive thermal insulator 574, 674. The passive thermal insulator 574, 674 can have the structure of the passive thermal insulators previously described. Provided here, the component thermally isolates the enclosure 553, 653 from the outside environment, which is desirable to control the operating temperature of the battery module (or modules) contained therein. Advantageously, the passive thermal insulator 574, 674 can have the resilient and highly conformable properties of the passive thermal insulators in the fire protection articles 100, 200, 300, 400, enabling this layer to expand into and fill the space between the tray 554, 654 and bottom plate 576, 676 despite the channels 555, 655 and any other irregularities along the outer surface of the tray 554, 654.

Each battery compartment 550, 650 may accommodate a single battery module or a plurality of battery modules. As will be shown in subsequent embodiments, each module and/or each cell within a module can be protected by surrounding structures that reduce the hazards of thermal runaway.

Figure 7:
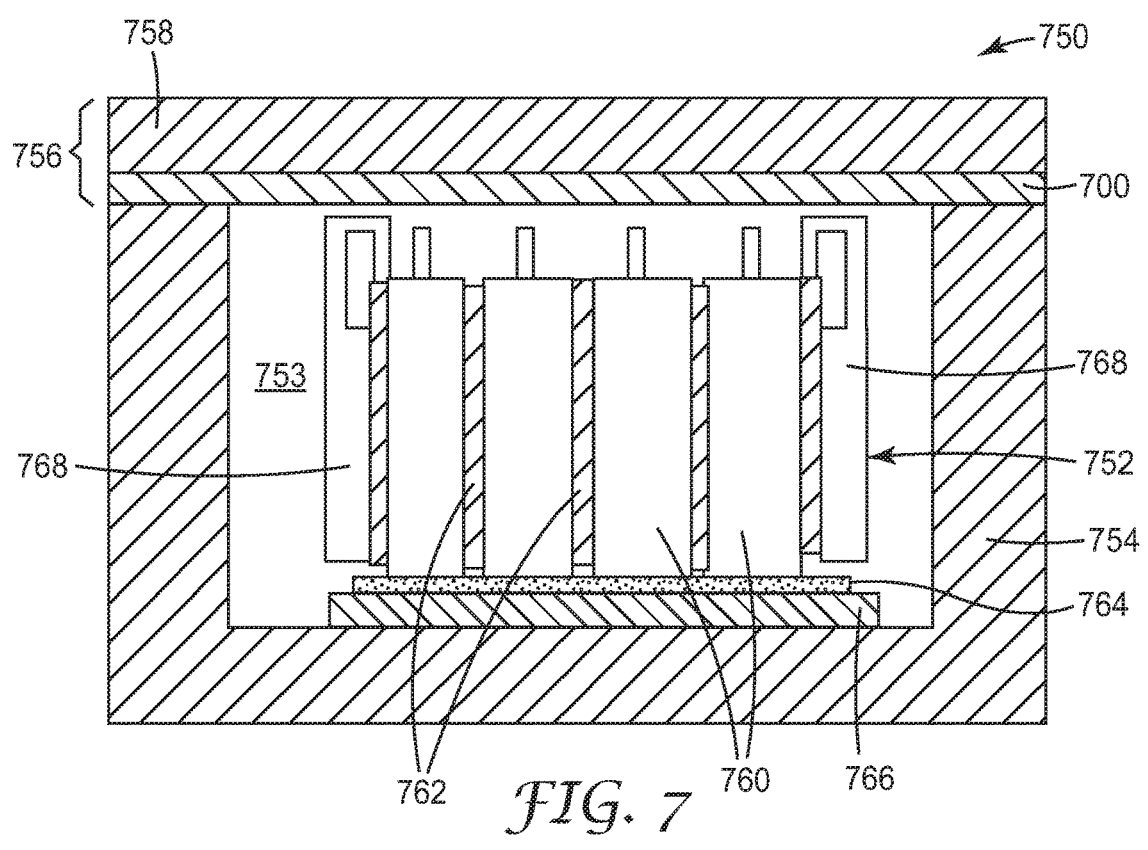
FIGS. 7-8 are side cross-sectional views of battery assemblies according to various exemplary embodiments.

FIG. 7 shows an exemplary battery assembly. The battery assembly includes an exemplary battery compartment 750 incorporating a fire protection article 700 and a battery module 752 contained therein. The battery module 752 resides in an enclosure 753 having inner surfaces defined by the battery compartment 750.

The battery compartment 750 includes a tray 754 and a lid 756 that are mutually engaged to isolate and prevent spread of a battery fire. The lid 756 includes the fire protection article 700, which extends along the bottom surface of the lid 756 and defines the top surface of the enclosure 753. Optionally and as shown, the fire protection article 700 is attached to an upper plate 758, which imparts the lid 756 with further structural rigidity and fire protection. In instances where the compartment wall is an integral part of the fire protection article (as in, e.g., fire protection articles 300, 400 of FIGS. 3 and 4), the upper plate 758 could be omitted.

In this embodiment, the fire protection article 700 is only needed along the top surface of the battery compartment because the battery compartment 750 is located along the underside of the vehicle and thus vehicle occupants only need protection from one side of the battery module 752.

The battery module 752 contains a plurality of cells 760, or individual batteries, that are electrically interconnected. Located between the cells 760 are intercellular fire barriers 762. The intercellular fire barriers 762 can have any of the characteristics already described with respect to the fire barriers in the fire protection articles 100, 200, 300, 400. The fire barriers 762 help prevent a fire in one cell from propagating to its neighboring cells. The lateral ends of the battery module 752 are secured by end plates 768.

The bottom of each cell 760 is in contact with a thermal interface material 764, which is in turn in contact with a coolant plate 766. The coolant plate 766 has a relatively high thermal mass and the thermal interface material 764 has a high thermal conductivity, enabling heat to be effectively dissipated into the coolant plate 766 in case thermal runaway occurs.

Figure 8:
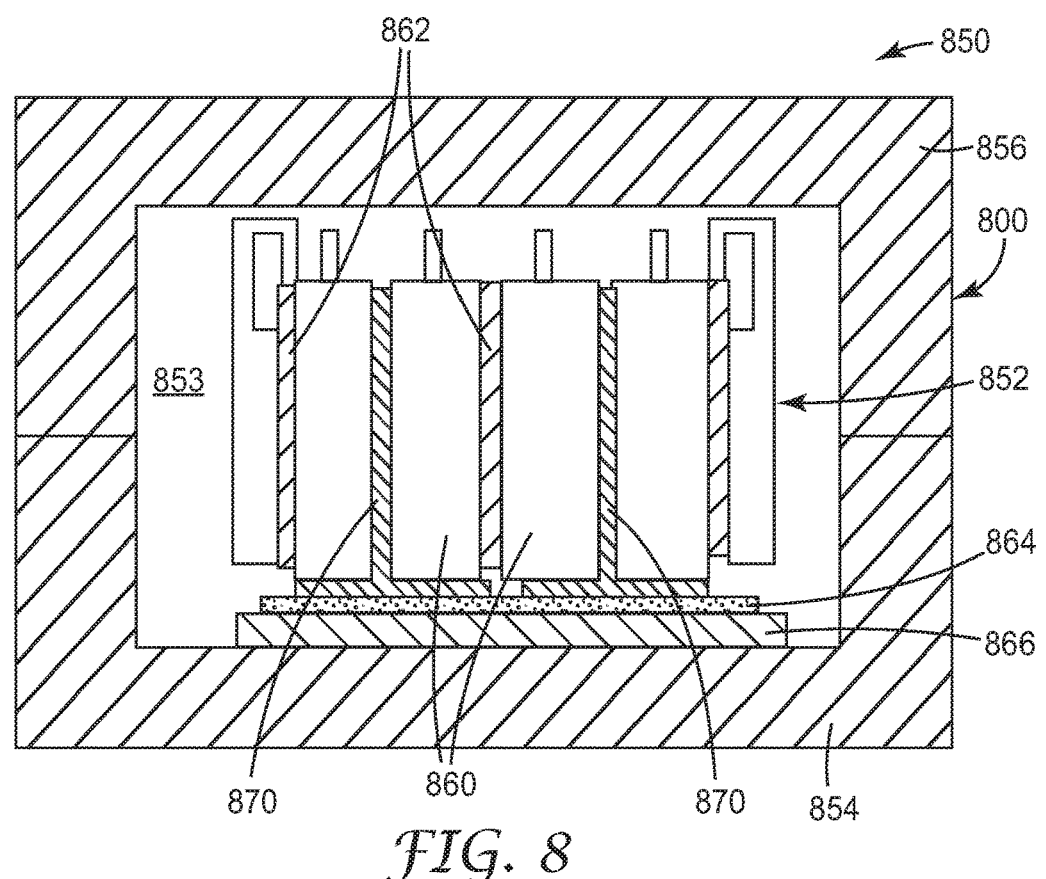

FIG. 8 shows a battery assembly according to another embodiment in which a battery compartment 850 has a fire protection article 800 extending along four sides of a battery module 852 therein. As shown in this cross-sectional view, the fire protection article 800 can extend along all sides of the battery module 852. While not explicitly shown here, small openings may be provided to allow electrical harnesses and any coolant hoses to communicate with the outside environment.

The fire protection article 800 includes a symmetrically disposed lid 856 and tray 854 that can be mutually engaged as shown to provide enclosure 853. Optionally, a flexible rubber gasket or O-ring may be present between the lid 856 and tray 854 to provide an air tight seal between the lid 856 and tray 854. Having the fire protection article 800 fully surround the battery module 852 can help prevent a cell bursting from the side of the enclosure 853 and causing a fire.

In this embodiment, thermally-conductive fins 870 extend along the spaces between some adjacent cells 860 of the battery module 852, while fire barriers 862 extend along spaces between other adjacent cells 860. The thermally-conductive fins 870 can be made from aluminum, graphitic carbon, or any other suitable thermally-conductive material. Coated graphite materials include graphite coated with polymeric insulator such as polyester or a ceramic insulator. The thermally-conductive fins 870 assist in extracting heat from the areas surrounding the individual cells 860 and conveying that heat into coolant plate 866 via thermal interface material 864. Drawing heat away from the initiation site of thermal runaway can arrest propagation by preventing neighboring cells from getting too hot.

Details relating to the respective compositions of the fire barrier, passive thermal insulator, scrim, and binder layer are described in the subsections below.

Fire Barriers

The provided fire protection articles incorporate fire barriers that not only prevents or delays propagation of a fire but provide strength to the fire protection article to survive pressure shocks that might occur from expanding gases created by venting of battery cells when a battery fire begins. The vented gases can have temperatures of about 150° C., making this a meaningful reference temperature for assessing the tensile properties of fire barrier materials. The fire barrier is preferably made from a flexible and non-combustible material, such a woven or non-woven web of non-combustible fibers.

Non-combustible fibers include ceramic fibers. Various known ceramic fibers can be adapted for use in refractory, insulation, and fire barrier materials. Known ceramic materials that can be made into high-temperature fibers include glass, silica, silicon carbide, alumina, alumina silica, and basalt. Most of these fibers can resist temperatures in excess of 1000° C. and can also be very strong.

Particularly useful ceramic fibers for this application include ceramic oxide fibers that can be processed into fire-resistant fabrics. These materials can be made suitable for textiles by mixing small amounts of silica, boron oxides, or zirconium oxides into alumina to avoid formation of large crystalline grains, thereby reducing stiffness and increasing strength at ambient temperatures. Commercial examples of these fibers include filament products provided under the trade designation NEXTEL by 3M Company, St. Paul, MN. These fibers can be converted into woven fibrous webs that display both fire barrier properties and high strength.

Other useful materials that can be used in the fire barrier include ceramic fiber materials that combine alkaline earth silicate (AES) low biopersistent fibers, aluminosilicate ceramic fibers (RCF), and/or alumina silica fibers and vermiculite with an acrylic latex and other refractory materials to obtain a heat-resistant non-woven fibrous web, or mat. Examples of these are described, for example, in PCT Publication No. WO 2018/093624 (De Rovere, et al.) and 6,051,103 (Lager, et al.). In some cases, these fiber materials are blended with flame-retardant additives such as aluminum trihydrate. These materials are optionally intumescent, whereby the material swells up when heated to seal openings in the event of a fire. Examples of these ceramic fiber materials include products provided under the trade designation FYREWRAP by Unifrax I LLC, Tonawanda, NY.

Still other fire barrier materials can be made by combining both organic and inorganic fibers to form a fire-resistant fibrous felt. For example, fibers of silica, polyphenylene sulfide, and poly paraphenylene terephthalamide can be formed into a coated fabric. Some of these fabrics, available from TexTech Industries, Portland, ME, have been used as burnthrough insulation in aerospace applications.

Suitable fire barriers can be comprised of substantially continuous fibers—that is, fibers that are not chopped. At combustion temperatures, fire barriers based on substantially continuous fibers can provide improved strength compared with those using chopped fibers, especially when these substantially continuous fibers are interlocked and entangled. This strength difference tends to be greater at these high temperatures where binders get burned out of the material and the fibers themselves must sustain the load.

Useful non-combustible fibers can have very high melting temperatures to preserve the integrity of the fire barrier when exposed to fire. High melting temperatures also help avoid softening or creep in the fire barrier material under operating conditions. Polycrystalline α-alumina-based fibers, for example, can have melting temperatures well in excess of 1400° C. The non-combustible fibers can have a melting temperature in the range from 700° C. to 2000° C., from 800° C. to 2000° C., from 1100° C. to 1700° C., or in some embodiments, less than, equal to, or greater than 700° C., 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000° C.

The fibers of the fire barrier can have a diameter that imparts sufficient fiber flexibility and toughness to process the fibers into a flexible woven or non-woven web. Appropriate fiber diameters can be in the range from 3 micrometers to 300 micrometers, from 10 micrometers to 200 micrometers, from 11 micrometers to 100 micrometers, or in some embodiments, less than, equal to, or greater than 1 micrometers, 2, 3, 4, 5, 7, 10, 15, 20, 25, 30, 35, 40, 45, 50, 60, 70, 80, 90, 100, 110, 120, 150, 170, 200, 250, or 300 micrometers.

It is preferable that these same non-combustible fibers display high tensile strength at elevated temperatures, such as those encountered in a fire. The ability for these fibers to retain their strength at high temperatures can be characterized by the break strength of the fiber after aging the fiber for a pre-determined amount of time at an elevated temperature. For example, these non-combustible fibers can enable either the overall fire protection article or the fire barrier alone to obtain a time to break in the 1100° C. Break Strength Test (as defined in the forthcoming Examples section) of at least 1 second, of at least 2 seconds, of at least 5 seconds, or in some embodiments, less than, equal to, or of at least 1 second, 2, 3, 4, 5, 7, 10, 12, 15, 17, 20, 25, 30, 35, 40, 45, 50, 60, 70, 80, 90, 100, 120, 150, 170, 200, 500, 700, 1000, 5000, 10000, or 50000 seconds.

Related to this, the overall fire protection article or the fire barrier alone can have an erosion rate in the 1100° C. Break Strength Test (as defined in the forthcoming Examples section) in the range from 0 centimeters per second to 0.15 centimeters per second, from 0 centimeters per second to 0.1 centimeters per second, from 0 centimeters per second to 0.01 centimeters per second, or in some embodiments, equal to or greater than 0 centimeters per second or less than, equal to, or greater than 0.01 centimeters per second, 0.02, 0.03, 0.04, 0.05, 0.06, 0.07, 0.08, 0.09, 0.1, 0.11, 0.12, 0.13, 0.14, or 0.15 centimeters per second.

These same non-combustible fibers can also provide the fire barrier with high strength properties at elevated temperatures that are below combustion temperatures. For example, the overall fire protection article or the fire barrier alone can have a minimum tensile strength at 150° C. of at least 5 kPa, at least 7 kPa, at least 10 kPa, or in some embodiments, less than, equal to, or greater than 5 kPa, 6, 7, 8, 9, 10, 12, 15, 20, 25, 30, 35, 40, 45, 50, 60, 70, 80, 90, 100, 120, 150, 170, 200, 250, 300, 350, 400, 450, 500, 600, 700, 800, 900, 1000, 2000, or 5000 kPa. In fire barrier materials made using a continuous process, minimum tensile measurements are generally made by testing materials along the cross-web direction (as opposed to the down-web, or machine, direction) since this is the direction along which the material is weakest.

It is understood that the fire barrier need not be exclusively made from non-combustible fibers, or even non-combustible materials. For example, the fire barrier may include laminates that contain non-fibrous layers. Non-fibrous layers can include one or more film layers, support layers, and adhesive layers. In some embodiments, the fire barrier may incorporate inorganic fillers such as inorganic platelet materials comprised of vermiculite, mica, clay or talc. Aforementioned layers and fillers may be formed into a laminate using organic and/or inorganic binders. Examples of such laminates are described in U.S. Pat. No. 9,676,168 (Contzen et al.).

Passive Thermal Insulators

The passive thermal insulator contains a plurality of non-meltable fibers. In a preferred embodiment, the non-meltable fibers are processed into a non-woven fibrous web. Non-meltable fibers are made from a polymer or other material that does not become a liquid at any temperature. In some cases, these polymers do not melt because they oxidize or otherwise degrade first when heated in the presence of air. The non-meltable polymeric fibers can include carbon fibers, carbon fiber precursors, or a combination thereof.

Carbon fiber precursors include oxidized acrylic precursors, such as oxidized polyacrylonitrile. Polyacrylonitrile is a useful acrylic precursor that can be used widely to produce the carbon fibers. In some embodiments, the polyacrylonitrile contains more than 70 wt %, more than 75 wt %, more than 80 wt %, or more than 85 wt % acrylonitrile repeat units.

Non-meltable polymeric fibers besides oxidized polyacrylonitrile fibers may also be used. Such fibers include dehydrated cellulosic precursors such as rayon. Non-meltable polymeric fibers further include lignin fibers. Lignin is a complex polymer of aromatic alcohols known as monolignols, and is derived from plants. Monolignol monomers include p-coumaryl alcohol, coniferyl alcohol, and sinapyl alcohol, which are methoxylated to varying degrees.

Non-meltable polymeric fibers also include certain thermoset materials, such as epoxy, polyimide, melamine, and silicone. Natural fibers, such as cotton, linen, hemp, silk, and animal hairs, simply burn without melting. Rayon is the artificial silk made from cellulose. When cellulose burns, it produces carbon dioxide and water and can also form a char.

Carbon fiber precursors can also include pitch-based precursors. Pitches are complex blends of polyaromatic molecules and heterocyclic compounds, which can be used as precursors of carbon fibers or carbon fillers in carbon composites. Vinylidene chloride and phenolic resins can, in some embodiments, be precursors for manufacture of carbon fibers.

In a preferred embodiment, the non-meltable fibers are comprised of oxidized polyacrylonitrile fibers. The oxidized polyacrylonitrile fibers can include, for example, those available under the trade designations PYRON (Zoltek Corporation, Bridgeton, MO) and PANOX (SGL Group, Meitingen, Germany).

The oxidized polyacrylonitrile fibers can derive from precursor fibers containing a copolymer of acrylonitrile and one or more co-monomers. Useful co-monomers include, for example, methyl methacrylate, methyl acrylate, vinyl acetate, and vinyl chloride. The co-monomer(s) may be present in an amount of up to 15 wt %, 14 wt %, 13 wt %, 12 wt %, 11 wt %, 10 wt %, 9 wt %, or 8 wt %, relative to the overall weight of the monomer mixture prior to copolymerization.

Oxidation of the precursor fibers can be achieved by first stabilizing the precursor fibers at high temperatures to prevent melting or fusion of the fibers, carbonizing the stabilized fibers to eliminate the non-carbon elements and finally a graphitizing treatment at even higher temperatures to enhance the mechanical properties of the non-woven fibers. Oxidized polyacrylonitrile fibers, as referred to herein, include polyacrylonitrile fibers that are either partially or fully oxidized. In some embodiments, the plurality of non-meltable polymeric fibers are stabilized, as described in co-pending International Patent Application No. PCT/CN2017/110372 (Cai et al.).

Generally, the non-meltable polymeric fibers used in the passive thermal insulator can have a fiber diameter and length that enables the fibers to become entangled within the passive thermal insulator. The fibers, however, are preferably not so thin that web strength is unduly compromised. The fibers can have an average fiber diameter in the range from 1 micrometers to 100 micrometers, from 2 micrometers to 50 micrometers, from 5 micrometers to 20 micrometers, or in some embodiments, less than, equal to, or greater than 1 micrometer, 2, 3, 5, 7, 10, 15, 20, 25, 30, 40, 50, 60, 70, 80, 90, or 100 micrometers.

Using relatively long fibers can reduce fiber shedding and further enhance strength of the passive thermal insulator along transverse directions. The non-meltable polymeric fibers can have an average fiber length in the range from 10 millimeters to 100 millimeters, from 15 millimeters to 100 millimeters, from 25 millimeters to 75 millimeters, or in some embodiments, less than, equal to, or greater than 10 millimeters, 12, 15, 17, 20, 25, 30, 35, 40, 45, 50, 55, 60, 65, 70, or 75 millimeters.

The non-meltable polymeric fibers used to form the passive thermal insulator can be prepared from bulk fibers. The bulk fibers can be placed on the inlet conveyor belt of an opening/mixing machine in which they can be teased apart and mixed by rotating combs. The fibers are then blown into web-forming equipment where they are formed into a dry-laid passive thermal insulator.

As an alternative, a SPIKE air-laying forming apparatus (commercially available from FormFiber NV, Denmark) can be used to prepare nonwoven fibrous webs containing these bulk fibers. Details of the SPIKE apparatus and methods of using the SPIKE apparatus in forming air-laid webs are described in U.S. Pat. No. 7,491,354 (Andersen) and U.S. Pat. No. 6,808,664 (Falk et al.).

Bulk fibers can be fed into a split pre-opening and blending chamber with two rotating spike rollers with a conveyor belt. Thereafter, the bulk fibers are fed into the top of the forming chamber with a blower. The fibrous materials can be opened and fluffed in the top of the chamber and then fell through the upper rows of spikes rollers to the bottom of the forming chamber passing thereby the lower rows of spike rollers. The materials can then be pulled down on a porous endless belt/wire by a combination of gravity and vacuum applied to the forming chamber from the lower end of the porous forming belt/wire.

Alternatively, the non-woven material of the passive thermal insulator can be formed in an air-laid machine. The web-forming equipment may, for example, be a RANDO-WEBBER device commercially-available from Rando Machine Co., Macedon, NY. Alternatively, the web-forming equipment could produce a dry-laid web by carding and cross-lapping, rather than by air-laying. The cross-lapping can be horizontal (for example, using a PROFILE SERIES cross-lapper commercially-available from ASSELIN-THI-BEAU of Elbeuf sur Seine, 76504 France) or vertical (for example, using the STRUTO system from the University of Liberec, Czech Republic or the WAVE-MAKER system from Santex AG of Switzerland).

The non-meltable fibers can be present in any amount sufficient to provide the thermal insulator with the desired flame resistance and insulating properties. The non-meltable fibers can be present in an amount in the range from 60 wt % to 100 wt %, 70 wt % to 100 wt %, 81 wt % to 100 wt %, or in some embodiments, less than, equal to, or greater than 50 wt %, 55, 60, 65, 70, 75, 80, 85, 90, or 95 wt %, or less than or equal to 100 wt %.

In some embodiments, the passive thermal insulator includes a multiplicity of fiber entanglements, in which two or more discrete fibers become knotted or twisted together. The fibers within these entanglements, while not physically attached, can be sufficiently intertwined for them to resist separation when the entangled fibers are pulled in opposite directions.

Entanglements can be induced by a needle tacking process or hydroentangling process. Advantageously, these processes can provide entanglements in which the fibers in the passive thermal insulator are substantially entangled along directions perpendicular to the major surfaces of the passive thermal insulator, thereby enhancing loft and increasing strength of the passive thermal insulator along these directions.

The passive thermal insulator can be entangled using a needle tacker commercially available under the trade designation DILO from Dilo of Germany, with barbed needles (commercially available, for example, from Foster Needle Company, Inc., of Manitowoc, WI) whereby the substantially entangled fibers described above are needle tacked fibers. Needle tacking, also referred to as needle punching, entangles the fibers perpendicular to the major surface of the passive thermal insulator by repeatedly passing an array of barbed needles through the web and retracting them while pulling along fibers of the web.

The needle tacking process parameters, which include the type (or types) of needles used, penetration depth, and stroke speed, are not particularly restricted. Further, the optimum number of needle tacks per area of mat will vary depending on the application. Typically, the passive thermal insulator is needle tacked to provide an average of at least 5 needle tacks/cm$^2$. The mat can be needle tacked to provide an average of 5 to 60 needle tacks/cm$^2$, 10 to about 20 needle tacks/cm$^2$, or in some embodiments, less than, equal to, or greater than 5, 6, 7, 8, 9, 10, 12, 15, 17, 20, 25, 30, 35, 40, 45, 50, 55, or 60 needle tacks/cm$^2$.

Further options and advantages associated with needle tacking are described elsewhere, for example in U.S. Patent Publication Nos. 2006/0141918 (Rienke), 2011/0111163 (Bozouklian et al.), and co-pending International Patent Application No. PCT/CN2017/110372 (Cai et al.).

The non-woven materials of the passive thermal insulator can also be hydroentangled using a water entangling unit (commercially available from Honeycomb Systems Inc. of Bidderford, Me.; also see U.S. Pat. No. 4,880,168 (Randall, Jr.)). Although the preferred liquid to use with the hydroentangler is water, other suitable liquids may be used with or in place of the water.

In a water entanglement process, a pressurized liquid such as water is delivered in a curtain-like array onto the non-woven material, which passes beneath the liquid streams. The mat or web is supported by a wire screen, which acts as a conveyor belt. The mat feeds into the entangling unit on the wire screen conveyor beneath the jet orifices. The wire screen is selected depending upon the final desired appearance of the entangled mat. A coarse screen can produce a mat having perforations corresponding to the holes in the screen, while a very fine screen (e.g., 100 mesh) can produce a mat without the noticeable perforations.

Optionally, the passive thermal insulator includes both a plurality of non-meltable fibers blended with a plurality of secondary fibers that are meltable.

In some embodiments, the secondary fibers include binder fibers, which have a sufficiently low melting temperature to allow subsequent melt processing of the passive thermal insulator. Binder fibers are generally polymeric and may have uniform composition or contain two or more components. In some embodiments, the binder fibers are bi-component fibers comprised of a core polymer that extends along the axis of the fibers and is surrounded by a cylindrical shell polymer. The shell polymer can have a melting temperature less than that of the core polymer. Binder fibers can, alternatively, be monofilament fibers made from a single polymer.

As used herein, however, "melting" refers to a gradual transformation of the fibers or, in the case of a bi-component shell/core fiber, an outer surface of the fiber, at elevated temperatures at which the polyester becomes sufficiently soft and tacky to bond to other fibers with which it comes into contact, including non-meltable fibers and any other binder fibers having its same characteristics and, as described above, which may have a higher or lower melting temperature.

Useful binder fibers have outer surfaces comprised of a polymer having a melting temperature in the range from 100° C. to 300° C., or in some embodiments, less than, equal to, or greater than, 100° C., 105, 110, 115, 120, 125, 130, 135, 140, 145, 150, 160, 170, 180, 190, 200, 210, 220, 230, 240, 250, 260, 270, 280, 290, or 300° C.

An exemplary suitable bicomponent fiber could have a polyester or nylon core with a low melting polyolefin sheath. As a further example, the bicomponent fiber could have a polyester core with a polyester-polyolefin copolymer sheath such as Type 254 CELBOND fiber provided by KoSa, Houston, TX. This fiber has a sheath component with a melting temperature of approximately 230° F. (110° C.).

Suitable binder fibers can also include a homopolymer or copolymer in a monofilament construction. These include thermoplastic fibers with softening temperature less than 150° C. (such as polyolefin or nylon). Other suitable mono-component fibers include thermoplastic fibers with softening temperature less than 260° C. (such as certain polyester fibers).

Binder fibers increase structural integrity in the thermal insulator by creating a three-dimensional array of nodes where constituent fibers are physically attached to each other. These nodes provide a macroscopic fiber network, which increases tear strength, tensile modulus, preserves dimensional stability of the end product, and reduces fiber shedding. Advantageously, incorporation of binder fibers can allow bulk density to be reduced while preserving structural integrity of the passive thermal insulator, which in turn decreases both weight and thermal conductivity.

Generally, secondary fibers can have any suitable diameter to impart sufficient loft, compressibility, and/or tear resistance to the passive thermal insulator. The secondary fibers can have an average fiber diameter in the range from 10 micrometers to 1000 micrometers, 15 micrometers to 300 micrometers, 20 micrometers to 100 micrometers, or in some embodiments, less than, equal to, or greater than 10 micrometers, 15, 20, 25, 30, 35, 40, 45, 50, 60, 70, 80, 90, 100, 120, 150, 170, 200, 250, 300, 400, 500, 750, or 1000 micrometers.

The secondary fibers can be present in an amount in the range from 1 wt % to 40 wt %, 3 wt % to 30 wt %, 3 wt % to 19 wt %, or in some embodiments, equal to or greater than 0 wt %, or less than, equal to, or greater than 1 wt %, 2, 3, 4, 5, 7, 10, 15, 20, 25, 30, 35, 40, 45, or 50 wt %.

Preferred weight ratios of the oxidized polyacrylonitrile fibers to secondary fibers bestow both high tensile strength to tear resistance to the thermal insulator as well as acceptable flame retardancy—for instance, the ability to pass the UL-94V0 flame test. The weight ratio of oxidized polyacrylonitrile fibers to secondary fibers can be at least 4:1, at least 5:1, at least 10:1, or in some embodiments, less than, equal to, or greater than 4:1, 5:1, 6:1, 7:1, 8:1, 9:1, or 10:1.

By reducing the overall effects of thermal conduction and convection, it is possible to achieve surprisingly low thermal conductivity coefficients. The passive thermal insulators of the provided fire protection articles can display a thermal conductivity coefficient at ambient conditions of less than 0.035 W/K-m, less than 0.033 W/K-m, less than 0.032 W/K-m, or in some embodiments, less than, equal to, or greater than 0.031 W/K-m, 0.032, 0.033, 0.034, or 0.035 W/K-m, according to ASTM D1518-85 (re-approved 2003). Thermal conductivity coefficients in these ranges can be obtained with the passive thermal insulator in its relaxed configuration (i.e., uncompressed) or compressed to 20% of its original thickness based on ASTM D5736-95 (re-approved 2001).

To maximize the flame retardancy of the passive thermal insulator, it can be advantageous to use non-woven materials in which oxidized polyacrylonitrile fibers represent over 85 vol %, over 90 vol %, or over 95 vol % of the plurality of fibers present in the non-woven material.

Optionally, the oxidized polyacrylonitrile fibers and/or secondary fibers are crimped to provide a crimped configuration (e.g., a zigzag, sinusoidal, or helical shape). Alternatively, some or all of the oxidized polyacrylonitrile fibers and secondary fibers have a linear configuration. The fraction of oxidized polyacrylonitrile fibers and/or secondary fibers that are crimped can be less than, equal to, or greater than 5%, 10, 15, 20, 25, 30, 40, 50, 60, 70, 80, 90, or 100%. Crimping, as described in European Patent No. 0 714 248, can significantly increase the bulk, or volume per unit weight, of the passive thermal insulator.

Both induced fiber entanglements and fiber crimping can significantly increase the degree of loft in the passive thermal insulator. In exemplary embodiments, the passive thermal insulator has an average bulk density in the range from 15 kg/m³ to 50 kg/m³, 15 kg/m³ to 40 kg/m³, 20 kg/m³ to 30 kg/m³, or in some embodiments less than, equal to, or greater than 15 kg/m³, 16, 17, 18, 19, 20, 22, 24, 25, 26, 28, 30, 32, 35, 37, 40, 42, 45, 47, or 50 kg/m³.

Passive thermal insulators based on lofted non-woven fibrous webs can be highly compressible. Compressibility can also be useful, as to allow a web of the invention to be pressed into and fully occupy a space that is being insulated. These materials can also exhibit good recovery when compressed. The provided passive thermal insulators can be capable of recovering over 60%, over 70%, over 80%, or in some embodiments, less than, equal to, or greater than 50%, 60, 65, 70, 75, 80, 85, or 90% of its original thickness when compressed, based on the Web Recovery test described in U.S. Pat. No. 7,476,632 (Olson, et al.).

Binders

The passive thermal insulator can include one or more polymeric binders to bond the fire barrier and passive thermal insulator to each other, or to bond either the fire barrier or passive thermal insulator to other adjacent layers or substrates. Binders may be rendered in a particulate or emulsified form, or as a continuous film. In some cases, the binder can enable the edge sealing peripheral edges of the fire protection article, or any of its constituent layers, to mitigate the problem of fiber shedding. The binder can be disposed onto one or both major surfaces of the fire barrier, passive thermal insulator, scrims, and/or any other layers or substrates present, and then the binder can be melted or otherwise activated to bond opposing layer surfaces to each other.

Useful binders include polymeric binders. Polymeric binders include fluoropolymers, perfluoropolymers, polytetrafluoroethylene, a thermoplastic fluoropolymer such as hexafluoropropylene-vinylidene fluoride-tetrafluoroethylene polymer, vinyl, rubber (including but not limited to Viton, butyl, and fluoroelastomers), polyvinyl chloride, and polymers of urethane, acrylics, or silicone. The binder can, in some embodiments, comprise a blend of a fluoropolymer and a polyimide, a polyamideimide, or a polyphenylene sulfide.

Some polymeric binders, such as thermoplastic binders, can be readily melted to obtain a flowable composition that coats the surfaces to be bonded, and then cooled to close the bond. These materials can be heat laminated to each other in either a manual or continuous process.

Other polymeric binders are curable polymeric binders that crosslink upon being heated, exposed to actinic radiation, or otherwise chemically activated. Curable polymeric binders include water-based latexes such as latexes of polyurethane or (meth)acrylate polymer. Other curable binders include, but are not limited to, epoxies, epoxy curing agents, phenolics, phenols, cyanate esters, polyimides (e.g., bismaleimide and polyetherimides), polyesters, benzoxazines, polybenzoxazines, polybenzoxazones, polybenzimidazoles, polybenzothiazoles, polyamides, polyamidimides, polysulphones, polyether sulphones, polycarbonates, polyethylene terephthalates, cyanates, cyanate esters, polyether ketones (e.g., polyether ketone, polyether ether ketone, polyether ketone ketone), combinations thereof, and precursors thereof.

It is also possible for binder to include inorganic compositions, such as a silica, alumina, zirconia, kaolin clay, bentonite clay, silicate, micaceous particles, precursors thereof, and any combinations thereof. Inorganic binders are provided as a powder and widely used in cementitious materials. The powder can be activated with water after application and the water removed to form the interlayer bond. When binding a ceramic polycrystalline fiber nonwoven web, inorganic bonds can be formed between ceramic fibers through the firing of a precursor inorganic binder such as a silicone oil (siloxane, polydimethylsiloxane, etc.). Nonwoven mats incorporating these inorganic binders are described in co-pending U.S. Provisional Patent Application, Ser. No. 62/670,011 (De Rovere).

The binder can assume any of many different forms. In some embodiments, a polymeric binder is incorporated directly into a non-woven fibrous layer (such as the passive thermal insulator) through inclusion of binder fibers as described above.

In other embodiments, the binder is provided as a coating. The coating can be disposed in a liquid form on the passive thermal insulator, fire barrier, scrims, or any combination thereof, and then subsequently solidified. The coating can be applied using any known method, such as solution casting or hot melt coating. Solution casting methods including brush, bar, roll, wiping, curtain, rotogravure, spray, or dip coating techniques. In some embodiments, the binder is coated onto the passive thermal insulator and permeates through the passive thermal insulator such that the binder is disposed within the bulk of the material. The binder layer can then be obtained by removing the solvent from the coated binder solution. Solvent removal is generally induced by heat—for example, by drying in an oven.

Exemplary binder coatings include those made from an acrylic polymer latex or polyurethane based latex. Exemplary polymeric binders include those provided under the trade designations POLYCO 3103 (acrylic/vinyl acetate copolymer), RHOPLEX HA-8, and DSM NEWREZ R-966 (polyurethane based latex) by Dow Chemical Company, Midland, MI. Other useful binder materials include fluorinated thermoplastics, optionally in the form of an aqueous emulsion, such as those provided under the trade designation THV and provided by 3M Company, St. Paul, MN.

The latex can be solvent cast onto a given layer or substrate from an aqueous solution. The latex binder can be present in any suitable amount relative to the solids content of the aqueous solution. The latex binder can be present in an amount in the range from 1 wt % to 70 wt %, 3 wt % to 50 wt %, 5 wt % to 20 wt %, or in some embodiments, less than, equal to, or greater than 1 wt %, 2, 3, 4, 5, 7, 10, 12, 15, 17, 20, 25, 30, 35, 40, 45, 50, 55, 60, 65 or 70 wt % based on the overall solids weight of the aqueous solution.

The binder can also provide adhesion between the scrims and the passive thermal insulator. This can be achieved by coating the binder onto the bonding surfaces of the scrim(s) or passive thermal insulator before placing the scrims in contact with the passive thermal insulator. Optionally, the binder can be spray or dip coated onto these inner surfaces from solution.

The coating should be sufficiently thick to form an edge seal that is generally uniform and void-free when the scrims, and optionally the passive thermal insulator, are subjected to heat and/or pressure. The minimum coating weight for a given application would depend on the porosity and thickness of the scrims and passive thermal insulator, among other factors. In exemplary embodiments, the coating has a basis weight in the range from 2 gsm to 100 gsm, from 5 gsm to 50 gsm, from 10 gsm to 20 gsm, or in some embodiments, less than, equal to, or greater than 2 gsm, 3, 4, 5, 7, 10, 12, 15, 17, 20, 25, 30, 35, 40, 45, 50, 55, 60, 65, 70, 75, 80, 85, 90, 95, or 100 gsm.

It can be advantageous for the coating to contain other components in addition to the binder. For example, where the binder is not flame resistant, the coating can further include flame-retardant additives and intumescents. Intumescents are substances that swell as a result of heat exposure.

Useful flame-retardant additives include phosphate-based additives, such as ammonium polyphosphate. Ammonium polyphosphate is an inorganic salt of polyphosphoric acid and ammonia, and may be either a linear or branched polymer. Its chemical formula is $[NH_4PO_3]_n(OH)_2$, where each monomer consists of an orthophosphate radical of a phosphorus atom with three oxygens and one negative charge neutralized by an ammonium cation leaving two bonds free to polymerize. In the branched cases some monomers are missing the ammonium anion and instead link to other monomers. Aqueous solutions of ammonium polyphosphate are commercially available, for example, under the trade designation EXOLIT from Clariant International Ltd., Muttenz, Switzerland. Organophosphates other than ammonium polyphosphate can also be used.

Other additives that can enhance fire resistance of the coating include intumescents. In the provided thermal insulators, an intumescent additive can include one or more of: (1) a phosphorus-containing part, provided for example by ammonium polyphosphate, (2) a hydroxyl-containing part that increases char in the event of a fire, such as sucrose, catechol, pentaerythritol, and gallic acid, and (3) a nitrogen-containing part that can act as blowing agent, such as melamine or ammonium. In some embodiments, components (1)-(3) are all used in combination. Intumescents can also include graphite filler, such as expandable graphite. Expandable graphite is a synthesized intercalation compound of graphite that expands when heated. By expanding into gaps, such materials can further slow or prevent fire propagation through these gaps.

In some embodiments, flame-retardant additives are dissolved or dispersed with the binder in a common solvent and both components solution cast onto the scrims and/or the passive thermal insulator. For example, ammonium polyphosphate can conveniently be cast from an aqueous solution that also contains a polymer latex.

The flame-retardant additive can be present in an amount in the range from 5 wt % to 95 wt %, from 10 wt % to 90 wt %, from 20 wt % to 60 wt %, or in some embodiments, less than, equal to, or greater than 5 wt % 10, 15, 20, 25, 30, 35, 40, 45, 50, 55, 60, 65, 70, 75, 80, 85, 90, or 95 wt % based on the overall solids weight of the coating.

The aqueous solution itself can have any suitable concentration to provide an appropriate viscosity for the selected coating method, and provide for a uniform coating on the fibers of the scrims and/or the passive thermal insulator. For spray coating, it is typical to use a solids content in the range from 1 wt % to 50 wt %, from 2.5 wt % to 25 wt %, from 5 wt % to 15 wt %, or in some embodiments, less than, equal to, or greater than 1 wt %, 1.5, 2, 2.5, 3, 3.5, 4, 4.5, 5, 6, 7, 8, 9, 10, 12, 15, 17, 20, 25, 30, 35, 40, 45, or 50 wt %.

Scrims

The scrims referred to in the figures are not particularly restricted, and can include any type of solid or porous film or open mesh structure which may be woven or non-woven. The scrim can extend across a major surface of the passive thermal insulator opposite the fire barrier, or alternatively, could extend across a major surface of the fire barrier opposite the passive thermal insulator.

Woven scrims may have any type of weave, and non-woven scrims are produced using any well-known technique, including melt blowing, spun lace and spun bond techniques.

Non-woven scrims have entangled, chemically-bonded or thermally-bonded fibrous structures, and can be made from any of a broad variety of fibers including polyethylene fibers, polypropylene fibers, mixtures of polyethylene and polypropylene fibers, nylon fibers (such as the nylons described above), polyester fibers (such as polyethylene terephthalate), acrylic and modacrylic fibers such as poly-acrylonitrile fibers and acrylonitrile and vinylchloride copo-lymer fibers, polystyrene fibers, polyvinylacetate fibers, polyvinylchloride fibers, rayon, cellulose acetate fibers, glass fibers and viscose fibers. In addition to the above synthetic fibers there may also be used the natural fibers such as cotton or wool.

In the provided thermal insulators, suitable polymeric fibers used to produce the scrim include polyamides, poly-esters and polyolefins, particularly polyethylene and poly-propylene, or a combination thereof. The scrim may also contain fiberglass. In some embodiments, the open mesh fabric comprises at least one nylon, a high-density polyeth-ylene or a combination thereof.

In various embodiments, each of the scrims is composed of flame resistant fibers. While fiberglass fibers have better intrinsic fire resistance than the aforementioned polymers, even combustible polymers can be provided with significant fire resistance by blending with sufficient amounts of a flame-retardant additive. For example, these scrims can be made from flame-resistant polyester fibers.

The flame-retardant additive can be either miscible or immiscible with the host polymer. Miscible additives include polymer melt additives such as phosphorus-based flame retardants that contain phenolic end groups. Polyphos-phonates, including polyphosphonate homopolymers and copolymers, can also be miscibly blended with polyesters to form flame-resistant fibers. Useful additives are commer-cially available under the trade designation NOFIA from FRX Polymers, Inc., Chelmsford, MA. Generally, miscible additives are preferred in making scrims with fine fiber diameters. If fiber diameters are larger than 10 microns, then inclusion of certain immiscible salts could also be used to enhance fire resistance.

Flame resistant fibers can be, in some embodiments, capable of passing the UL94-V0 flammability standard when formed into a non-woven web made from 100% of such fibers, and having a base weight of less than 250 gsm and web thickness of less than 6 millimeters.

Suitable scrims need not be fibrous. Scrims can, for example, include continuous films that are perforated to form a mesh-like structure. Useful scrims can be made from a perforated film, such as described in U.S. Pat. No. 6,617, 002 (Wood), U.S. Pat. No. 6,977,109 (Wood), and U.S. Pat. No. 7,731,878 (Wood). Scrims could also be made from solid films of a suitable polymer such as a fluoropolymer provided under the trade designation THV by 3M Company or polyetheretherketone (PEEK).

The scrims are generally much thinner than the passive thermal insulator. To minimize the weight of the thermal insulator, the scrims can be made only as thick as necessary to serve the purpose of encapsulating loose fibers in the passive thermal insulator while satisfying any technical requirements for strength and toughness. In a preferred embodiment, one or both scrims have a basis weight in the range from 10 gsm to 100 gsm, from 20 gsm to 80 gsm, from 30 gsm to 70 gsm, or in some embodiments, less than, equal to, or greater than 10 gsm, 12, 15, 17, 20, 25, 30, 35, 40, 45, 50, 55, 60, 65, 70, 75, 80, 85, 90, 95, or 100 gsm.

Fiber Sizings

Further variants are possible. For example, the fibers in the passive thermal insulator and/or scrim can be coated, or sized, with other compositions that are not binders. Fiber sizings can be selected from, for example, silicones, acry-lates, and fluoropolymers whereby the passive thermal insu-lator has an emissivity of less than 0.5. Here, "emissivity" is defined as the ratio of the energy radiated from a material's surface to that radiated from a blackbody (a perfect emitter) at the same temperature and wavelength and under the same viewing conditions. Reducing emissivity helps lower the extent to which a material loses heat from thermal radiation.

Coating the constituent fibers of the passive thermal insulator can impart significant functional and/or aesthetic benefits. For example, coating the fibers has the effect of reinforcing the fibers, thus increasing the overall strength of the web. Certain coating materials, such as fluoropolymers and silicones, may enhance resistance to staining or fouling because of airborne substances becoming adhered to fiber surfaces. In some applications it can be desirable to sheath the fibers in an opaque coating, can also be used to change the color of the passive thermal insulator, which would be generally be black or grey for oxidized polyacrylonitrile fibers or other carbonized fibers.

Further exemplary embodiments, not intended to be lim-iting, are enumerated as follows:

1. A fire protection article comprising: a fire barrier comprising a plurality of non-combustible fibers; and a passive thermal insulator coupled to the fire barrier, the passive thermal insulator comprising a plurality of non-meltable fibers, wherein the fire protection article displays a time to break in the 1100° C. Break Strength Test of at least 10 seconds.

2. The fire protection article of embodiment 1, wherein the fire protection article displays a time to break in the 1100° C. Break Strength Test of at least 60 seconds.

3. The fire protection article of embodiment 2, wherein the fire protection article displays a time to break in the 1100° C. Break Strength Test of at least 150 seconds.

4. A fire protection article comprising: a fire barrier comprising a plurality of non-combustible fibers; and a passive thermal insulator coupled to the fire barrier, the passive thermal insulator comprising a plurality of non-meltable fibers, wherein the fire protection article displays a minimum tensile strength at 150° C. of at least 5 kPa.

5. The fire protection article of embodiment 4, wherein the fire protection article displays a minimum tensile strength at 150° C. of at least 7 kPa.

6. The fire protection article of embodiment 5, wherein the fire protection article displays a minimum tensile strength at 150° C. of at least 10 kPa.

7. A fire protection article comprising: a fire barrier comprising a plurality of non-combustible fibers; and a passive thermal insulator coupled to the fire barrier, the passive thermal insulator comprising a plurality of non-meltable fibers, wherein the fire barrier comprises substantially continuous fibers that are mutually entangled.

8. The fire protection article of any one of embodiments 1-7, wherein the fire barrier is a woven fibrous web.

9. The fire protection article of any one of embodiments 1-8, wherein the non-combustible fibers have a melting temperature in the range from 700° C. to 2000° C.

10. The fire protection article of embodiment 9, wherein the non-combustible fibers have a melting temperature in the range from 800° C. to 1850° C.

11. The fire protection article of embodiment 10, wherein the non-combustible fibers have a melting temperature in the range from 1100° C. to 1700° C.

12. The fire protection article of any one of embodiments 1-11, wherein the non-combustible fibers comprise ceramic oxide fibers.

13. The fire protection article of embodiment 12, wherein the ceramic oxide fibers comprise alumina silica.

14. The fire protection article of any one of embodiments 1-13, wherein the non-combustible fibers have an average diameter in the range from 3 micrometers to 300 micrometers.

15. The fire protection article of embodiment 14, wherein the non-combustible fibers have an average diameter in the range from 10 micrometers to 200 micrometers.

16. The fire protection article of embodiment 15, wherein the non-combustible fibers have an average diameter in the range from 11 to 100 micrometers.

17. The fire protection article of any one of embodiments 1-16, wherein the fire barrier has an overall thickness in the range from 100 micrometers to 25000 micrometers.

18. The fire protection article of embodiment 17, wherein the fire barrier has an overall thickness in the range from 500 micrometers to 1250 micrometers.

19. The fire protection article of embodiment 18, wherein the fire barrier has an overall thickness in the range from 2000 micrometers to 5000 micrometers.

20. The fire protection article of any one of embodiments 1-19, wherein the non-meltable fibers comprise oxidized polyacrylonitrile.

21. The fire protection article of any one of embodiments 1-20, wherein the non-meltable fibers have an average fiber diameter in the range from 1 micrometers to 100 micrometers.

22. The fire protection article of embodiment 21, wherein the non-meltable fibers have an average fiber diameter in the range from 2 micrometers to 50 micrometers.

23. The fire protection article of embodiment 22, wherein the non-meltable fibers have an average fiber diameter in the range from 5 micrometers to 20 micrometers.

24. The fire protection article of any one of embodiments 1-23, wherein the passive thermal insulator comprises a non-woven fibrous web of the non-meltable fibers.

25. The fire protection article of embodiment 24, wherein the non-woven fibrous web has an average bulk density in the range from 15 kg/m$^3$ to 50 kg/m$^3$.

26. The fire protection article of embodiment 25, wherein the non-woven fibrous web has an average bulk density in the range from 17 kg/m$^3$ to 40 kg/m$^3$.

27. The fire protection article of embodiment 26, wherein the non-woven fibrous web has an average bulk density in the range from 20 kg/m$^3$ to 30 kg/m$^3$.

28. The fire protection article of any one of embodiments 24-27, wherein the non-woven fibrous web further comprises a plurality of aramid fibers.

29. The fire protection article of any one of embodiments 24-28, wherein the non-woven fibrous web is substantially entangled along directions perpendicular to a major surface of the non-woven fibrous web.

30. The fire protection article of any one of embodiments 1-29, wherein the passive thermal insulator has a thickness in the range from 1 millimeters to 50 millimeters.

31. The fire protection article of embodiment 30, wherein the passive thermal insulator has a thickness in the range from 2 millimeters to 25 millimeters.

32. The fire protection article of embodiment 31, wherein the passive thermal insulator has a thickness in the range from 3 millimeters to 20 millimeters.

33. The fire protection article of any one of embodiments 1-32, further comprising a polymeric binder coupling the fire barrier and passive thermal insulator to each other.

34. The fire protection article of embodiment 33, wherein the polymeric binder is a curable polymeric binder.

35. The fire protection article of embodiment 34, wherein the curable polymeric binder is heat-activated.

36. The fire protection article of any one of embodiments 33-35, wherein the polymeric binder comprises a fluoropolymer binder.

37. The fire protection article of embodiment 36, wherein the fluoropolymer binder comprises a thermoplastic fluoropolymer binder.

38. The fire protection article of embodiment 37, wherein the fluoropolymer binder comprises a hexafluoropropylene-vinylidene fluoride-tetrafluoroethylene polymer.

39. The fire protection article of any one of embodiments 33-38 wherein the polymeric binder is coated onto one or both major surfaces of the fire barrier.

40. The fire protection article of any one of embodiments 33-39, wherein the polymeric binder is coated onto one or both major surfaces of the passive thermal insulator.

41. The fire protection article of embodiment 40, wherein the polymeric binder is further disposed within the passive thermal insulator.

42. The fire protection article of any one of embodiments 1-32, further comprising an inorganic binder coupling the fire barrier and passive thermal insulator to each other.

43. The fire protection article of any one of embodiments 1-42, further comprising a scrim extending across a major surface of the passive thermal insulator opposite the fire barrier.

44. The fire protection article of any one of embodiments 1-43, further comprising a scrim extending across a major surface of the fire barrier opposite the passive thermal insulator.

45. The fire protection article of embodiment 43 or 44, wherein the scrim comprises a polyester.

46. The fire protection article of embodiment 45, wherein the polyester comprises polyethylene terephthalate.

47. The fire protection article of any one of embodiments 43-46, wherein the scrim comprises rayon.

48. The fire protection article of any one of embodiments 1-47, further comprising a metal layer disposed on a major surface of the fire barrier opposite the passive thermal insulator.

49. The fire protection article of embodiment 48, wherein the metal layer comprises aluminum.

50. The fire protection article of any one of embodiments 43-49, wherein the scrim or passive thermal insulator has a peripheral edge and wherein the scrim and passive thermal insulator are edge-sealed along the peripheral edge.

51. The fire protection article of any one of embodiments 1-50, wherein the fire barrier has a major surface facing toward a fire source.

52. A battery compartment for an electric vehicle comprising: a compartment wall having an inner and outer major surface, the inner major surface providing at least part of an enclosure; and the fire protection article of any one of embodiments 1-51 disposed on either the inner or outer surface.

53. A battery compartment for an electric vehicle comprising: at least one compartment wall having an inner and outer major surface, the inner major surface defining at least part of an enclosure; a fire barrier disposed on the inner major surface, the fire barrier comprising a plurality of non-combustible fibers; and a passive thermal insulator disposed on the outer major surface, the passive thermal insulator comprising a plurality of non-meltable fibers, wherein the fire protection article displays a time to break in the 1100° C. Break Strength Test of at least 10 seconds.

54. The battery compartment of embodiment 53, further comprising a polymeric binder coupling the fire barrier and passive thermal insulator to each other.

55. The battery compartment of embodiment 53 or 54, wherein the polymeric binder comprises a fluoropolymer binder.

56. The battery compartment of any one of embodiments 53-55, wherein the at least one compartment wall comprises a pair of compartment walls that, when mutually engaged, collectively provide the enclosure.

57. The battery compartment of any one of embodiments 53-56, wherein the fire barrier and passive thermal insulator are located above the enclosure.

58. The battery compartment of embodiment 53-57, further comprising a plurality of batteries received in the enclosure.

59. The battery compartment of embodiment 58, wherein the plurality of batteries are separated by an intercellular fire barrier comprising a plurality of non-combustible fibers, the intercellular fire barrier displaying a time to break in the 1100° C. Break Strength Test of at least 10 seconds.

60. The battery compartment of embodiment 58 or 59, wherein the plurality of batteries are separated by a thermally-conductive material.

61. The battery compartment of embodiment 60, wherein the thermally-conductive material comprises aluminum, graphitic carbon, or a combination thereof.

62. A method of making a fire protection article comprising: coating a polymeric binder onto an outer surface of a fire barrier comprising a plurality of non-combustible fibers; placing the coated fire barrier in contact with a passive thermal insulator comprising a plurality of non-meltable fibers; and heating the polymeric binder to laminate the fire barrier and passive thermal insulator to each other to provide the fire protection article with a time to break in the 1100° C. Break Strength Test of at least 10 seconds.

63. The method of embodiment 62, wherein coating the polymeric binder onto the fire barrier comprises dip coating the fire barrier in a polymeric binder solution and removing solvent from the coated polymeric binder solution.

64. The method of embodiment 63, wherein the polymeric binder solution is an aqueous solution.

65. The method of any one of embodiments 62-64, wherein the polymeric binder comprises a fluoropolymer binder.

66. The method of any one of embodiments 62-65 further comprising depositing a metal layer onto a major surface of the fire barrier, the passive thermal insulator, or both.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

| Materials | | |
| --- | --- | --- |
| Designation | Description | Source |
| OPAN 1 | Oxidized polyacrylonitrile staple fibers, 1.7 dTex available under the trade designation "OX" | Zoltek ™ Corporation (wholly owned subsidiary of Toray Group), Bridgeton, MO. |
| OPAN Mat | Oxidized polyacrylonitrile fiber mat, 450 gsm under the trade designation Pyron° | Zoltek ™ Corporation (wholly owned subsidiary of Toray Group), Bridgeton, MO. |
| Hi-Loft | Fuselage burn-through insulation MC8-7926B, 170 gsm | Tex Tech Industries of Portland, ME. |
| PolyX Nonwoven Mat 1 | Polycrystalline alumina silica (PolyX) needled nonwoven mat, 640 gsm | 3M Company, Saint Paul, MN. |
| PolyX Nonwoven Mat 2 | Polycrystalline alumina silica (PolyX) inorganically bonded mat, 279 gsm | 3M Company, Saint Paul, MN. |
| FR PET Scrim with Adhesive | A flame retardant polyethylene terephthalate scrim material with a heat activated adhesive on one side, 70 gsm | Precision Fabrics Group, Inc., Greensboro, NC. |
| Silicone Lubricant | Silicone lubricant available under the trade designation 08877 or 08879 | 3M Company, Saint Paul, MN. |

Test Methods

Nonwoven Web Thickness Measurement: The method of ASTM D5736-95 was followed, according to test method for thickness of high loft nonwoven fabrics. The plate pressure was calibrated at 0.002 psi (13.790 Pascal).

Small-Scale Burn-through Test: A small scale laboratory procedure was used to measure the temperature at intervals and amount of time it took to burn through a sample held in a vertical position using a 10-mm flame applied perpendicularly. An MT 525 C nozzle with 10 mm diameter from MagTorch of Cleveland, OH. was connected to a 14.1 oz Bernzomatic propane torch cylinder from Bernzomatic of Columbus, OH. The nozzle with the flame extinguished was positioned 7.62 cm from a stand and clamp apparatus at a height of 30 cm. A 10-cm×10-cm tested sample was then vertically clamped to the stand so that the center of the sample was at a height of 30 cm. The contact wire/probe from a 54-2-B Dual Input Thermometer from Fluke of Wilmington, North Carolina was affixed to the side of the sample that opposed the nozzle at a height of 30 cm. The torch was then ignited. A timer was activated as soon as the tip of the flame (initially at a temperature of 1150° C.) impacted the sample. The temperature of the sample was measured at designated intervals and the timer was stopped as soon as a temperature spike was recorded to indicate that burn-through had occurred or after ten minutes had elapsed (whichever occurred first).

1100° C. Break Strength Test: A small scale laboratory procedure was used to measure the amount of time it took for a sample held horizontally to break while exposed to a perpendicularly applied flame and under tension from a 0.981 N weight. An MT 525 C nozzle with 10 mm diameter from MagTorch of Cleveland, Ohio was connected to a 14.1 oz Bernzomatic propane torch cylinder from Bernzomatic of Columbus, Ohio. Two stands with clamps (one on the left and another on the right) were positioned 12.7 cm apart. The nozzle with the flame extinguished was positioned 7.62 cm from the leftmost stand and 5.08 cm from the rightmost stand at a height of 25.08 cm. The nozzle was positioned 7.62 cm above a 10.16 cm×1.27 cm sample that was clamped between the two stands at a height of 20 cm. A 100-g mass (0.981 N weight) with a 2.54 cm diameter and a height of 2.7 cm was suspended from the sample with a 2.2 cm long hook 5.08 cm from the leftmost stand with clamp. The torch was ignited and a timer was activated as soon as the tip of the flame (initially at a temperature around 1150° C.) impacted the sample. The timer was stopped as soon as the sample broke or after three minutes had elapsed (whichever occurred first) and the amount of time was recorded to indicate length of time. An erosion rate was calculated based on the original thickness of the sample and the amount of time it took for the sample to break or reach three minutes.

Tensile Strength Test: The method of ASTM D882-12 Standard Test Method for Tensile Properties of Thin Plastic Sheeting was followed. An Instron 5565 with heated chamber from Instron of Norwood, Massachusetts was used with grip gaps set at 5.08 cm. Sample strips were cut at 2.54 cm wide. Three minutes passed between sample loads to reset the sensor temperature to 150° C.

Preparatory Example 1

A 30-cm×30-cm cut area of 100% (by weight) OPAN 1 was carded by passing the fibers through a Wave-Maker system from Santex AG to form a 150 gsm core web. The core web was then conveyed to a Dilo Needle Loom, Model DI-Loom OD-1 6 from Eberbach, Germany having a needle-board array of 23 rows of 75 needles/row where the rows are slightly offset to randomize the pattern. The needles were Foster 20 3-22-1.5B needles. The array was roughly 17.8 cm deep in the machine direction and nominally 61 cm wide with needle spacings of roughly 0.76 cm. The needleboard was operated at 91 strokes/minute to entangle and compact the web. The web thickness was 10 mm.

Preparatory Example 2

A fibrous polycrystalline oxide nonwoven mat (PolyX Nonwoven Mat 1) made from substantially continuous fibers was assembled and needled by processes and techniques described in Sol Making Method 2 and Fiber Spinning Method 1 of commonly owned PCT Application No. WO 2018/093624 published on May 24, 2018. More specifically, green fiber webs were mechanically entangled using a needle-tacker from Feltloom of Sharpsburg, Kentucky loaded with needles type 15×18×32×3½ U333 from Groz-beckert USA, Inc. from Fort Mill of South Carolina. After one pass through the needled-tacker, each sample was run again through the equipment after turning the sample over. Final punching density was calculated around 25 punch/cm². Next, needled green fiber webs were fired and sintered into a ceramic mat with a sintering temperature between 1285° C. and 1300° C.

Preparatory Example 3

A fibrous polycrystalline oxide nonwoven mat (PolyX Nonwoven Mat 2) made from substantially continuous fibers was assembled by processes and techniques described in Sol Making Method 2 and Fiber Spinning Method 1 of commonly owned PCT Application No. WO 2018/093624 published on May 24, 2018. However, rather than using the needling technique to bind the mat, a Silicone Lubricant wet inorganic binder was coated onto the mat as the fibers accumulated on the porous collector. The fibers were then fired and sintered into a ceramic mat with a sintering temperature between 1285° C. and 1300° C.

Comparative Example 1

A 0.8 cm thick OPAN Mat sample underwent small-scale burn-through testing. The result is represented in Table 2.

Comparative Example 2

A 0.5 cm thick Hi-Loft burn-through insulation sample underwent small-scale burn-through testing. The result is represented in Table 2.

Comparative Example 3

A 0.5 cm thick PolyX Nonwoven Mat 1 sample of Preparatory Example 2 underwent small-scale burn-through testing. The result is represented in Table 2.

Comparative Example 4

A 0.27 cm thick PolyX Nonwoven Mat 2 sample of Preparatory Example 3 underwent small-scale burn-through testing. The result is represented in Table 2.

Example 1

A 30-cm×30-cm sample of the OPAN 1 core web assembled in Preparatory Example 1 was manually layered on top of a 30-cm×30-cm FR PET Scrim with Adhesive and the 30-cm×30-cm PolyX Nonwoven Mat 1 of Preparatory Example 2 was manually layered on top of the OPAN 1 core web. The 1.65 cm thick, 900 gsm, stacked sample was cut to size and underwent small-scale burn-through testing. The result is represented in Table 2.

Example 2

A 30-cm×30-cm sample of the OPAN 1 core web assembled in Preparatory Example 1 was manually layered on top of a 30-cm×30-cm FR PET Scrim with Adhesive and the 30-cm×30-cm PolyX Nonwoven Mat 2 of Preparatory Example 3 was manually layered on top of the OPAN 1 core web assembled in Preparatory Example 1. The 1.4 cm thick, 529 gsm, stacked sample was cut to size and underwent small-scale burn-through testing. The result is represented in Table 2.

TABLE 2

| | | | Small Scale Burn-through Testing | | | |
|---|---|---|---|---|---|---|
| Time (min) | CE 1 (° C.) | CE 2 (° C.) | CE 3 (° C.) | CE 4 (° C.) | EX 1 (° C.) | EX 2 (° C.) |
| 0.00 | 22.6 | 22.6 | 22.6 | 22.6 | 22.6 | 22.6 |
| 0.08 | 51.6 | 192.7 | 237.7 | 140.0 | 23.0 | 52.2 |
| 0.17 | 110.6 | 302.8 | 375.9 | 276.0 | 23.0 | 72.3 |
| 0.25 | 181.4 | 373.6 | 476.4 | 417.5 | 45.3 | 124.2 |
| 0.5 | 337.7 | 449.7 | 549.0 | 615.3 | 68.1 | 285.0 |
| 1.0 | 480.5 | 692.5 | 570.1 | 672.0 | 59.4 | 377.8 |
| 2.0 | 533.0 | 721.5 | 562.4 | 681.4 | 230.2 | 396.8 |
| 3.0 | 563.1 | 745.3 | 569.2 | 690.2 | 342.8 | 405.5 |
| 4.0 | 583.3 | 744.1 | 566.2 | 685.7 | 359.6 | 416.7 |
| 5.0 | 632.0 | 803.4 | 571.3 | 688.6 | 361.4 | 416.0 |
| 6.0 | 1000.0 | 809.0 | 573.1 | 683.3 | 351.7 | 424.2 |
| 7.0 | N/A | 830.0 | 567.3 | 668.6 | 351.3 | 436.7 |
| 8.0 | N/A | 1000.0 | 559.7 | 684.0 | 351.7 | 441.7 |
| 9.0 | N/A | N/A | 561.5 | 688.0 | 347.8 | 458.0 |
| 10.0 | N/A | N/A | 563.9 | 690.0 | 355.3 | 461.3 |

Comparative Example 5

A 0.8 cm thick OPAN Mat sample underwent 1100° C. break strength testing. The result is represented in Table 3.

Comparative Example 6

A 0.5 cm thick Hi-Loft burn-through insulation sample underwent 1100° C. break strength testing. The result is represented in Table 3.

Comparative Example 7

A 0.5 cm thick PolyX Nonwoven Mat 1 sample of Preparatory Example 2 underwent 1100° C. break strength testing. The result is represented in Table 3.

Comparative Example 8

A 0.27 cm thick PolyX Nonwoven Mat 2 sample of Preparatory Example 3 underwent 1100° C. break strength testing. The result is represented in Table 3.

Example 3

A 30-cm×30-cm sample of the OPAN 1 core web assembled in Preparatory Example 1 was manually layered on top of a 30-cm×30-cm FR PET Scrim with Adhesive and the 30-cm×30-cm PolyX Nonwoven Mat 1 of Preparatory Example 2 was manually layered on top of the OPAN 1 core web. The 1.65 cm thick, 900 gsm, stacked sample was cut to size and underwent 1100° C. break strength testing. The result is represented in Table 3.

Example 4

A 30-cm×30-cm sample of the OPAN 1 core web assembled in Preparatory Example 1 was manually layered on top of a 30-cm×30-cm FR PET Scrim with Adhesive and the 30-cm×30-cm PolyX Nonwoven Mat 2 of Preparatory Example 3 was manually layered on top of the OPAN 1 core web assembled in Preparatory Example 1. The 1.4 cm thick, 529 gsm, stacked sample was cut to size and underwent 1100° C. break strength testing. The result is represented in Table 3.

TABLE 3

| | 1100° C. Break Strength Testing | | |
|---|---|---|---|
| Example | Original Thickness (cm) | Time to Break (seconds) | Erosion Rate (cm/seconds) |
| CE 5 | 0.8 | 5.0 | $1.6 \times 10^{-1}$ |
| CE 6 | 0.5 | 134.0 | $3.7 \times 10^{-3}$ |
| CE 7 | 0.5 | >180.0 | $<2.8 \times 10^{-3}$ |
| CE 8 | 0.27 | 180.0 | $1.5 \times 10^{-3}$ |
| EX 3 | 1.65 | >180.0 | $<9.2 \times 10^{-3}$ |
| EX 4 | 1.4 | >180.0 | $<7.8 \times 10^{-3}$ |

Comparative Example 9

A 0.8 cm thick OPAN Mat sample underwent tensile strength testing. The result is represented in Table 4.

Comparative Example 10

A 0.5 cm thick Hi-Loft burn-through insulation sample underwent tensile strength testing. The result is represented in Table 4.

Comparative Example 11

A 0.5 cm thick PolyX Nonwoven Mat 1 sample of Preparatory Example 2 underwent tensile strength testing. The result is represented in Table 4.

Comparative Example 12

A 0.27 cm thick PolyX Nonwoven Mat 2 sample of Preparatory Example 3 underwent tensile strength testing. The result is represented in Table 4.

Example 5

A 30-cm×30-cm sample of the OPAN 1 core web assembled in Preparatory Example 1 was manually layered on top of a 30-cm×30-cm FR PET Scrim with Adhesive and the 30-cm×30-cm PolyX Nonwoven Mat 1 of Preparatory Example 2 was manually layered on top of the OPAN 1 core web. The 1.65 cm thick, 900 gsm, stacked sample was cut to size and underwent tensile strength testing. The result is represented in Table 4.

Example 6

A 30-cm×30-cm sample of the OPAN 1 core web assembled in Preparatory Example 1 was manually layered on top of a 30-cm×30-cm FR PET Scrim with Adhesive and the 30-cm×30-cm PolyX Nonwoven Mat 2 of Preparatory Example 3 was manually layered on top of the OPAN 1 core web assembled in Preparatory Example 1. The 1.4 cm thick, 529 gsm, stacked sample was cut to size and underwent tensile strength testing. The result is represented in Table 4.

TABLE 4

| | Tensile Strength Testing | | |
| Example | Original Thickness (cm) | Peak Force (N) | Tensile Strength (kPa) |
| --- | --- | --- | --- |
| CE 9 | 0.8 | 1.74 | 8.6 |
| CE 10 | 0.5 | 16.10 | 126.8 |
| CE 11 | 0.5 | 7.16 | 56.4 |
| CE 12 | 0.27 | 6.85 | 99.9 |
| EX 5 | 1.65 | 13.84 | 33.0 |
| EX 6 | 1.4 | 8.90 | 25.0 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A battery compartment for an electric vehicle comprising:

at least one compartment wall having an inner and outer major surface, the inner major surface defining at least part of an enclosure and a fire protection article, the fire protection article comprising a fire barrier and a passive thermal insulator;

the fire barrier disposed on the inner major surface, the fire barrier comprising a plurality of non-combustible fibers; and the passive thermal insulator disposed on the outer major surface, the passive thermal insulator comprising a plurality of non-meltable fibers having a crimped configuration, wherein the passive thermal insulator comprises a non-woven fibrous web of the non-meltable fibers having a crimped configuration, wherein the non-meltable fibers comprise oxidized polyacrylonitrile, wherein the non-woven fibrous web includes a multiplicity of fiber entanglements in which the fibers are entangled along directions perpendicular to a major surface of the non-woven fibrous web and has an average bulk density in the range from 15 kg/m$^3$ to 40 kg/m$^3$, and wherein the fire protection article displays a time to break in the 1100° C. Break Strength Test of at least 10 seconds and/or displays a minimum tensile strength at 150° C. of at least 5 kPa.

2. The battery compartment of claim 1, wherein the non-meltable fibers of the passive thermal insulator are staple fibers.

3. The battery compartment of claim 2, wherein the fire barrier comprises substantially continuous fibers that are mutually entangled perpendicular to a major surface of the fire barrier.

4. The battery compartment of claim 3, wherein the substantially continuous fibers of the fire barrier are needle tacked.

5. The battery compartment of claim 2, wherein the non-combustible fibers of the fire barrier have a melting temperature in the range from 700° C. to 2000° C.

6. The battery compartment of claim 2, wherein the combustible fibers of the fire barrier comprise alumina silicate.

* * * * *